United States Patent
Brink et al.

(10) Patent No.: US 6,664,499 B1
(45) Date of Patent: Dec. 16, 2003

(54) TUBE AND DUCT TRIM MACHINE

(75) Inventors: Steve A. Brink, Seattle, WA (US); Noel A. Spishak, Bellevue, WA (US); Daniel L. Nydegger, Auburn, WA (US); Stephen L. Sembritzky, Wenatchee, WA (US); William R. Schell, Federal Way, WA (US); David M. Kozy, Kent, WA (US); Steven R. Walton, Wilkeson, WA (US); Ray Henderson, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/194,800

(22) Filed: Jul. 11, 2002

(51) Int. Cl.[7] .............................................. B23K 26/36
(52) U.S. Cl. ............................................... 219/121.67
(58) Field of Search ........................ 219/121.6, 121.67, 219/121.68, 121.69, 121.7, 121.71, 121.72, 121.82

(56) References Cited

U.S. PATENT DOCUMENTS

| | | |
|---|---|---|
| 4,274,621 A | * 6/1981 | Illakowicz et al. |
| 4,618,262 A | 10/1986 | Maydan et al. |
| 4,931,615 A | 6/1990 | Muncy et al. |
| 5,444,211 A | 8/1995 | Nakata et al. |
| 5,496,777 A | 3/1996 | Moriyama |
| 5,607,606 A | 3/1997 | Mori et al. |
| 5,744,778 A | 4/1998 | Kash et al. |
| 5,770,833 A | 6/1998 | Kanaoka et al. |
| 5,994,667 A | 11/1999 | Merdan et al. |

* cited by examiner

Primary Examiner—Samuel M. Heinrich
(74) Attorney, Agent, or Firm—DiPinto & Shimokaji, P.C.

(57) ABSTRACT

An apparatus and method is provided for cutting curved tube and duct assemblies using a high-powered laser, which locates, measures and follows a scribe line. The invention generally is comprised of a multi-axis laser-based machine tool to cut formed (i.e., curved) welded tube and duct detailed parts to a planar scribe line. It is further comprised of a laser focusing head positioned on a rotating and tilting platform; fixturing aids to position and hold the tubes or ducts to be cut; a machine vision system to locate and measure a scribe line in a plane on the tube or duct, thus determining its orientation; and a controller that tilts the turntable to a co-planar position, and then operates a high-powered laser to cut the duct at the scribe line.

55 Claims, 15 Drawing Sheets

TUBE AND DUCT TRIM MACHINE

BACKGROUND OF THE INVENTION

The present invention generally relates to apparatus and methods for cutting tube and duct assemblies to a planar scribe line and, more specifically, to apparatus and methods for cutting curved tube and duct assemblies using a high powered laser and a vision system which locates and measures a scribe line in a plane on the duct, thus determining its orientation.

Modern aircraft, automobiles, ships, power plants, and the like, utilize round nickel-based metal alloy, stainless steel, aluminum, titanium and other similar materials for ducts and tubes used for many applications, including the transfer of gases and fluids from one location to another. For example, welded duct assemblies and tubes are used for various systems on commercial aircraft, including engine bleed air ducting, thermal anti-ice ducting, engine starter ducting, auxiliary power unit ducting, and air conditioning ducting. In fact, for large complex commercial aircraft, there are several hundred detailed ducting parts that are welded together to form particular duct assemblies. The detailed ducting parts have varying diameters, curvatures, and lengths, and are formed by a Computer-Aided Numerical Control (CNC) tube bender to nearly every conceivable three-dimensional configuration.

The current practice at most parts fabrication shops, is to place the formed ducts and tubes into a fixture, such as a weld fixture, and to manually scribe a trim line around the part. FIG. 1 illustrates a typical duct trim diagram, where a scribe line 12 is placed along the outer circumference of typical curved duct 10 at the location where the final cut is to be made. The scribe line 12 is always in a plane 18 and is generally within an angle 16, which is perpendicular, within approximately 5 degrees, to the duct centerline 14. Because manufacturing processes are not normally precise due to duct and tube bending tolerances, weld fixture inaccuracies, and part placement repeatability, there are variations from one duct or tube assembly to the other, and thus each duct and tube detail must be individually scribed and cut.

Current cutting and trimming methods include band saws, friction saws, hand-held plasma arc, rotary shears and nibblers. Shop mechanics trim the tube or duct close to the scribe line using such well-known devices and then grind the remaining material up to the scribe line. All these operations are manual and each cut edge requires grinding and other hand finishing for a proper fit, thus resulting in a very labor-intensive operation. In addition, there are significant safety concerns with these manual methods because the mechanics hands are quite close to the blades and shears. Also, welded ducts with thicker walls, specially nickel-based metal alloy, are very difficult to trim with these manual methods.

Prior attempts to resolve this problem have included the introduction of more powerful saws, rotary shears, and hand held plasma-arc cutting systems. Though these trim a little faster, they still represent manual methods that require hand finishing, and also continue to pose a significant safety hazard. A duct trim tool using a conventional metal cutter has been employed advantageously in the past. However, such a tool is limited in that it is only capable of trimming straight tubes and ducts, and it is not a fast operation. Additionally, the most important limitation of this type of tool is that, particularly for aircraft, the vast majority of tubes and ducts (over 80%) are of a curved configuration.

A 5-axis numerically controlled laser machine is also not practical for cutting the ends of ducts, or for curved ducts. It would be very time consuming to find and record ("teach") the machine to cut a scribe line, as such a machine requires the generation of unique CNC part-programs (motion databases) for each single operation. Also such a machine would require a tooling system to hold and position the hundreds of different configuration curved ducts and tubes to be cut.

U.S. Pat. No. 5,744,778 to Kash, et al. discloses a laser cutting machine that has a tube stock support bearing assembly on the cutting head itself. The support bearing assembly includes an indexing plate rotatable on the stock rotating axis, and an array of circularly spaced, spring-loaded centering rollers permitting longitudinal movement through the bearing assembly. A pneumatically operated stock gripper and a bearing assembly enable stock of varying cross-sectional shapes to be pulled to desired positions for cutting. This invention differs from the inventive Tube and Duct Trim Machine in many ways, including its limitation to cutting tube diameters from 0.50 inch to 3.50 inch, it can only cut tube material to length, with end cuts being perpendicular to the longitudinal axis, it does not include a machine vision system to determine the location and angle of a scribe line, and it cannot position and hold nearly any curved configuration of duct details and sub-assemblies.

As can be seen, there is a need for an improved apparatus and method for cutting curved tube and duct assemblies using a high powered laser in conjunction with a vision system, and which can cut a duct or tube of nearly any straight or curved configuration and diameter to a planar scribe line with a high degree of accuracy without the use of dedicated fixturing.

SUMMARY OF THE INVENTION

According to one aspect of the present invention, a tube and duct trim machine, is disclosed comprising: a safety enclosure and tooling structure; a traveling overhead gantry and overhead gantry arm movably supported by said trolley; a vertical articulated arm; a plurality of grippers for rigid securement of tubes and ducts to said overhead gantry arm and to said vertical articulated arm; a rotatable and alignable turntable; a tube and duct centering/spatter device; a rough tube and duct positioning alignment unit; a laser cutting system, comprised of a controllable laser cutting head, a fiber optic beam cable and a laser power unit; a vision alignment system, comprised of a plurality of image acquisition modules, and a vision processor module; a machine operator control panel; a main cell controller; a platform mounted controller; whereby said tube and duct trim machine accurately positions and precisely cuts tubes and ducts at a pre-established offset distance from a planar scribe line.

In another aspect of the invention, a tube and duct trim machine, is disclosed comprising: a safety enclosure and tooling structure; an overhead gantry arm and a vertical articulated arm; a plurality of tube and duct grippers; a rotatable and alignable turntable; a tube and duct centering/spatter device; a rough tube and duct positioning alignment unit; a laser cutting system; a vision alignment system; a machine operator control panel; a main cell controller; a platform mounted controller; whereby said tube and duct trim machine accurately positions and precisely cuts tubes and ducts at a pre-established planar scribe line.

In yet another aspect of the invention, a machine is disclosed comprising: a safety enclosure and tooling structure; an overhead gantry arm and a vertical articulated arm; a plurality of grippers; a rotatable and alignable turntable; a centering/spatter device; a rough positioning alignment unit; a laser cutting system; a vision alignment system; a machine operator control panel; a main cell controller; a platform mounted controller; whereby said machine accurately positions and precisely cuts tubes, ducts and other such elements in relation to or relative to a pre-established planar scribe line.

In yet one final aspect of the invention, there is disclosed a method for trimming tubes and ducts, comprising the steps of: selecting and installing appropriate grippers and holding systems to support tubes and ducts; installing proper anti-spatter tubes; roughly positioning and aligning ducts and tubes on a turntable; selecting, on an operator control panel, cutting parameters for the tubes and ducts to be cut; initiating, on said operator control panel, the tube and duct trim machine automatic cutting sequence; removing the cut tube or duct from said tube or duct trim machine.

These and other features, aspects and advantages of the present invention will become better understood with reference to the following drawings, descriptions and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides an apparatus and method for cutting curved as well as straight tube and duct assemblies using a high a high powered laser and a vision system which locates and measures a scribe line in a plane on the duct, thus determining its orientation. The invention generally may be comprised of a multi-axis laser-based machine tool to cut formed (i.e., curved) welded tube and duct detailed parts to a planar scribe line. It may be further comprised of a focusable laser cutting focusing head positioned on a rotating and tilting platform; fixturing aids to position and hold the tubes or ducts to be cut; a machine vision system to locate and measure a scribe line in a plane on the tube or duct, thus determining its orientation; and a controller that tilts the turntable to a co-planar position to said scribe line and then operates a high powered laser to cut the duct at an orientation relative to said scribe line.

The inventive tube and duct trim machine may be employed to trim tubes and ducts used for modern aircraft, automobiles, ships, power plants, and the like. Examples of tubes and ducts that may be trimmed include round or nearly round (the inventive laser follower can compensate for ovality in the crossection) nickel-based metal alloy, stainless steel, and titanium. There is flexibility to hold and cut hundreds of different duct and tube configurations, and the machine may provide the following advantages over prior art devices and techniques: elimination of hand grinding of ducts and tubes; simplicity of operation in that knowledge of sophisticated computer programs is not required; no requirement for tooling dedicated for particular duct and tube configurations; machine portability; simple method of positioning the duct to be cut because lasers do not generate large cutting forces; and edge cutting quality that requires very little if any hand finishing.

Figure 1:
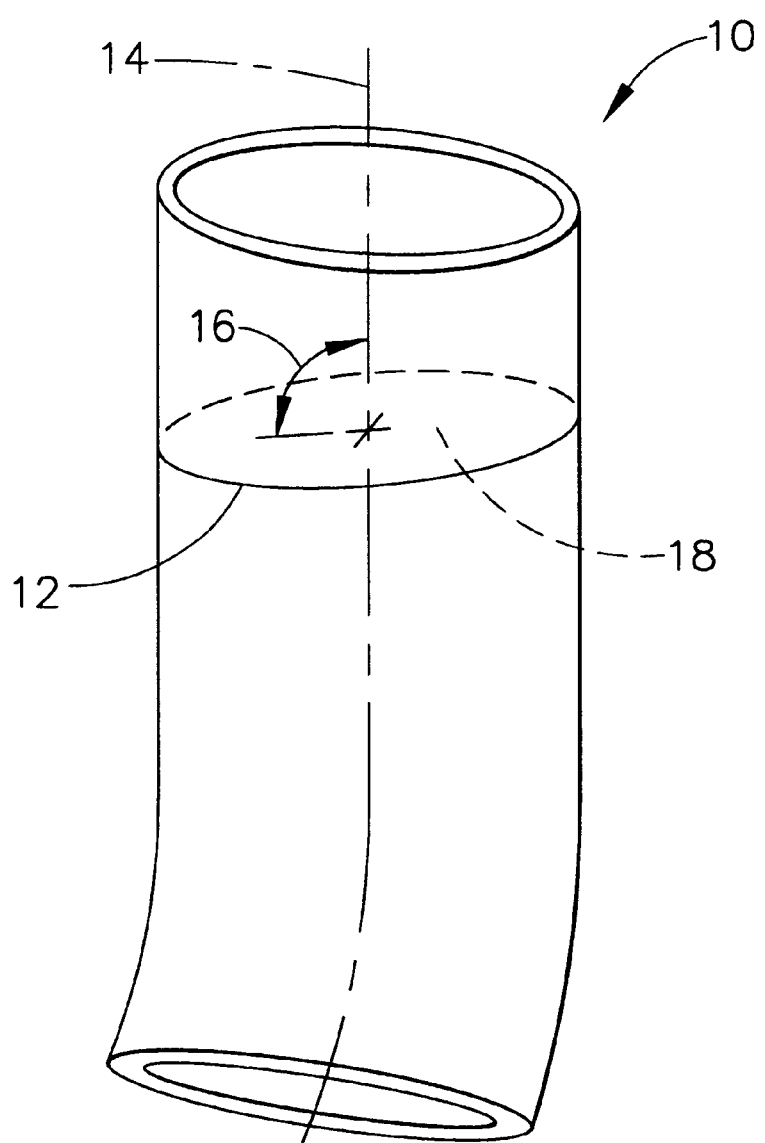
FIG. 1 is a partial view, in perspective, of a typical duct trim diagram.
Figure 2:
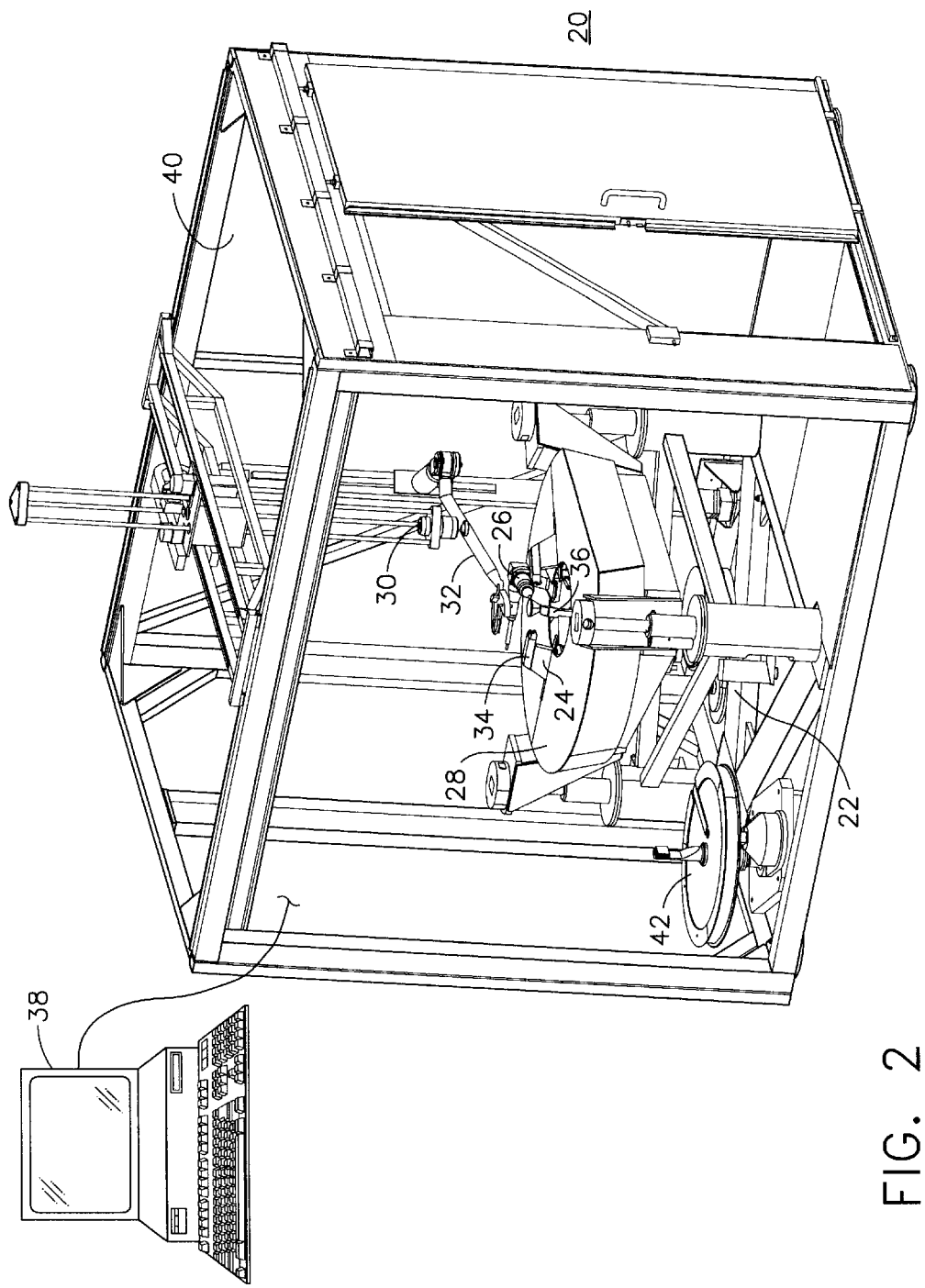
FIG. 2 is an overall perspective view of the inventive tube and duct trim machine.

Referring again to the accompanying drawings (in which like reference numerals indicate like parts throughout several views), and in particular to FIG. 2, there is shown an overall perspective view of the inventive tube and duct trim machine 20 (with exterior walls not shown for drawing clarity), which may be comprised of the following eight major components:

(1) A rotary platform assembly 22, which may hold the vision alignment system 24, and the laser cutting head 26, and may include a turntable 28 which may rotate in excess of 360 degrees, sufficiently to trim the entire circumference of a duct at or near a scribe line.

(2) A flexible duct holding system, which may hold the many configurations of ducts stable and rigid in free space for cutting. It may be comprised of an overhead gantry arm 30, a vertical articulated arm 32, and duct grippers (not shown).

(3) A rough positioning alignment unit which may be comprised of three laser line generators 34 to provide a visual guide to aid the operator to initially mount the duct in the proper position for trimming, and a duct centering/spatter tube device 36 to aid the operator in roughly centering the duct and to capture and contain molten metal material.

(4) A laser cutting system which may be comprised of a high powered laser cutting head 26 which allows for cutting of very heavy duct walls. A cable feeder 42 system may also be provided.

(5) A vision alignment system 24 which may be comprised of a vision processor module (not shown) and three image acquisition modules (also not shown).

(6) An operator's control panel 38.

(7) A machine control system (not shown) which may be comprised of a main cell controller, a platform mounted controller, and the operator's control panel 38.

(8) A laser safety enclosure and tooling structure 40 which may safely contain all laser cutting light and may provide a support for the rotary platform assembly 22, overhead gantry arm 30, and vertical articulated arm 32.

Figure 3:
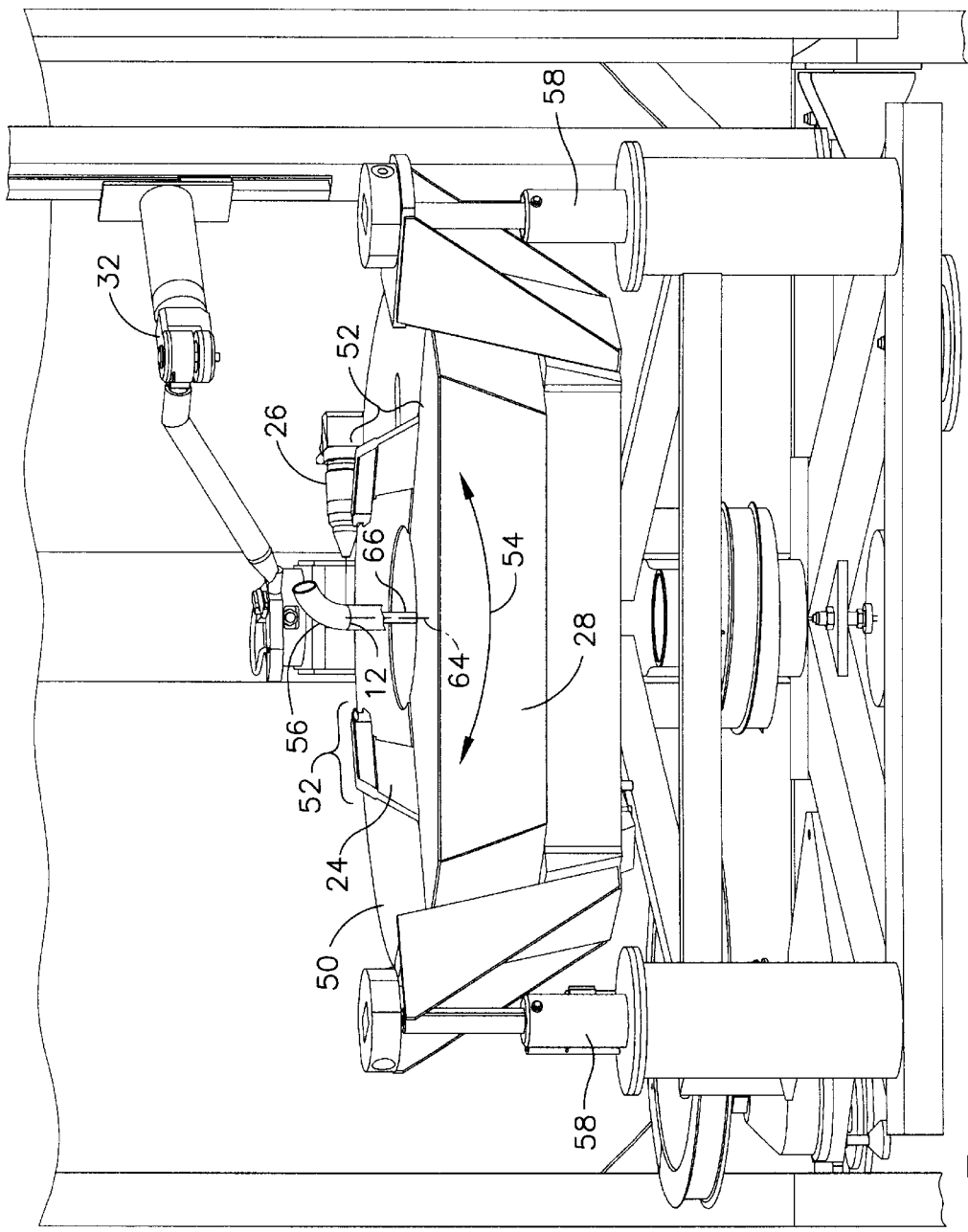
FIG. 3 is a partial perspective view of the rotary platform assembly and including the vertical articulated arm.

These and other features of the invention are described in more detail below:

FIG. 3 is a perspective view of the rotary platform assembly 22 and including the vertical articulated arm 32. Located on the top surface 50 of the turntable 28 may be three vision alignment systems 24 including image acquisition modules 52 and a laser cutting head 26. The turntable 28 may be capable of rotating in excess of 360 degrees, sufficiently to trim the entire circumference of a duct at or near a scribe line, in the direction shown by arrows 54 to cut the duct 56 (both ducts or tubes may be cut in the same manner, and the term duct as used hereafter in this specification is interchangeable with and intended to include tubes). The turntable 28 orientation may be controlled by three spring loaded servo-controlled vertical actuators 58 located 120 degrees apart to align the cutting plane (defined by the orientation of the laser cutting head 26) co-planar to the scribe line 12.

Figure 3A:
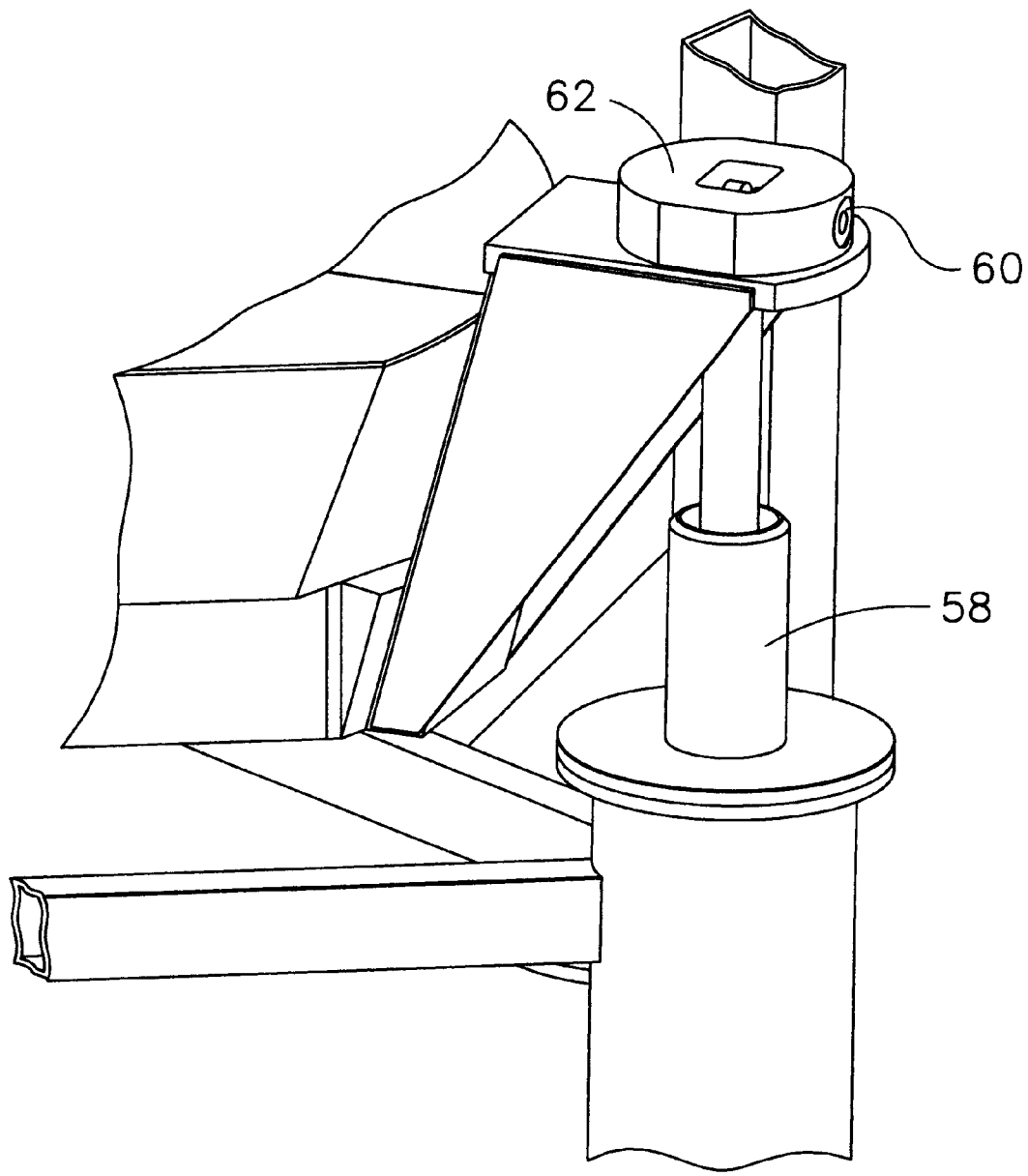
FIG. 3a is a partial magnified perspective view of a vertical actuator interface with the turntable.

Referring to FIG. 3a, there is shown a magnified perspective view of the interface between the turntable 28 and one vertical actuator 58. The vertical actuators 58 may be attached with radially oriented, free floating fasteners 60 in a spherical-type joint 62 (shown inside a housing), a configuration that is well-known in the art.

The kinematic characteristics of the turntable 28 may not be intended to precisely fix its center point 64 in space. In fact, the actual position of the turntable 28 center point 64 may shift about plus or minus 0.200 inches about the vertical axis established at the initial positioning operation. The capability of the z-axis follower (the laser cutting head servo axis, which is discussed in detail below) to compensate for the radial error as well as use of an iterative approach to angular error correction may make the inventive design practical. Up to three corrections may be required to move the turntable 28 to a position, which is co-planar (within about plus or minus 0.005 inch) with respect to the desired position relative to the scribe line 12.

Figure 4:
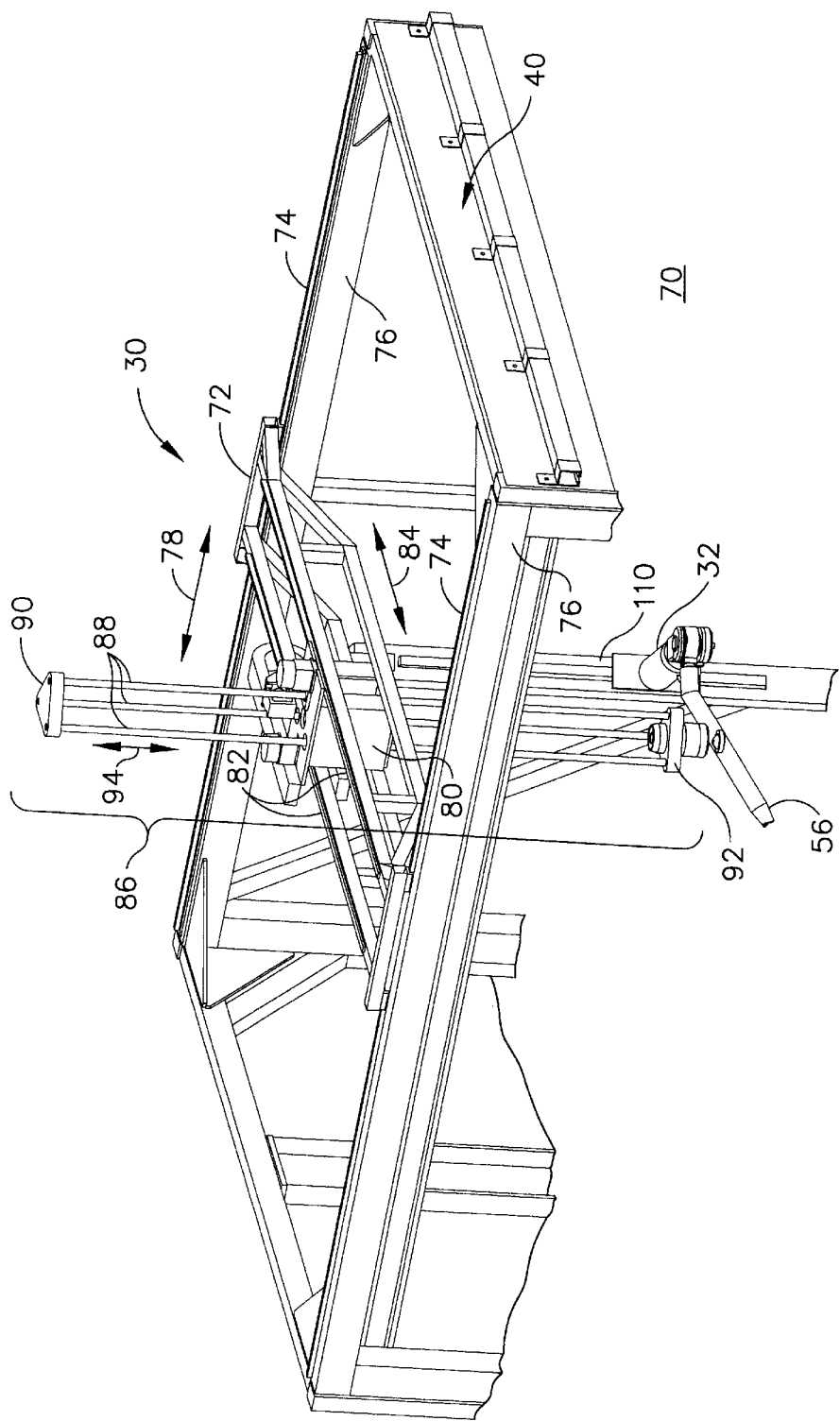
FIG. 4 is a partial magnified perspective view of the flexible duct holding system.

FIG. 4 is a perspective representation of the flexible duct holding system 70, which may hold the many configurations ducts 56 (not shown) stable and rigidly in free space, and yet may not interfere with the turntable 28 as it rotates and cuts the ducts 56. It is comprised of a four-axis overhead gantry arm 30, a four-axis vertical articulated arm 32, and duct grippers (not shown—described in detail below) to position and hold the ducts 56. The less rigid overhead gantry arm 30 may support the ducts 56 in a vertical or horizontal attitude while the end nearest the cutting plane (defined by the orientation of the laser cutting head 26) may be stabilized by the more rigid vertical articulated arm 32. The duct 56 may be held by one or both, overhead gantry arm 30 and/or rigid vertical articulated arm 32, to provide maximum flexibility.

The four-axis overhead gantry arm 30 may be comprised of a traveling overhead gantry 72, of a configuration well known in the art, movably mounted between two parallel longitudinal rails 74 traversing, in the direction of arrows 78, along the top longitudinal beams 76 of the laser enclosure and tooling structure 40. The traveling overhead gantry 72 may also be comprised of a trolley 80 movably mounted on two transverse rails 82, such that it may also translate transversely in the direction of arrows 84. Vertically mounted to the trolley 80 may be a vertical gantry arm 86, comprised of a triple tubular structure 88 with a top end fitting 90 and a bottom end mechanism 92. Said vertical gantry arm 86 may be movably engaged to the trolley 80, enabling translation in the vertical direction of arrows 94. In one embodiment, only the vertical travel of the overhead gantry arm 30, may be motorized due to the heavy weight of some duct assemblies, and all other axes are purely mechanical. This feature assists the operator in positioning the duct in two ways: first, it does the work moving the duct saving the operator considerable effort, and second, it allows the operator precise control over the final duct position. In another embodiment, all axes may be motorized. All axes brakes may be controlled by pneumatics.

Figure 5:
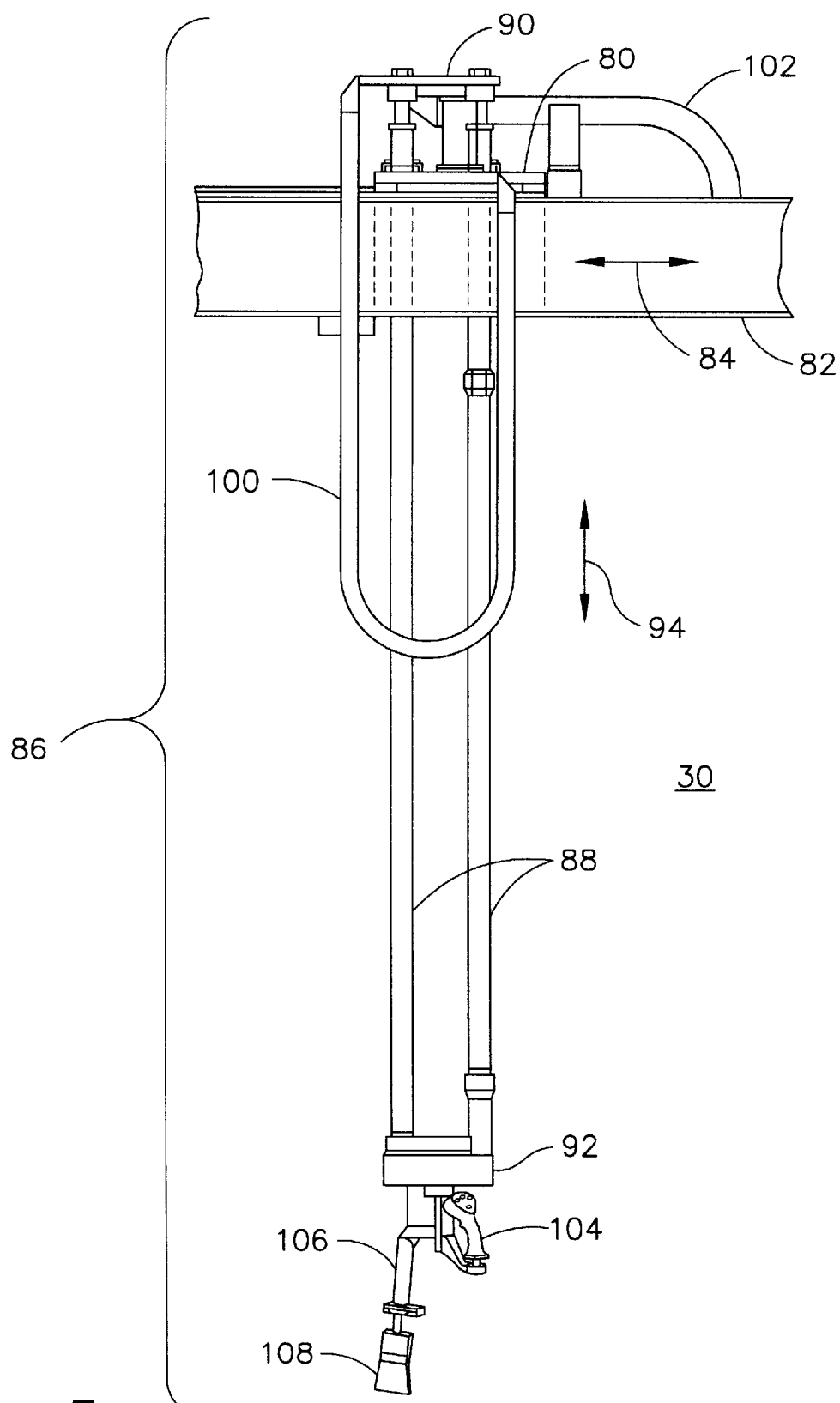
FIG. 5 is an elevational view of the flexible duct holding system overhead gantry arm.

Referring now to FIG. 5 there is shown an elevational view of the vertical gantry arm 86 segment of the overhead gantry arm 30 suspended from transverse rails 82 which interface with trolley 80, (shown partially hidden). Trolley 80 may traverse laterally along supporting transverse rails 82 in the direction of arrows 84. Similarly, triple tubular structure 88 may traverse vertically, in the direction of arrows 94, by means of well-known mechanisms, such as a pair of smooth roller drive mechanisms (not shown) which may provide enough friction to adequately lift the ducts and position them, while allowing slippage if the gantry is driven upward or downward to a hard stop. Triple tubular structure 88 may be held rigidly by top end fitting 90 and bottom end mechanism 92. Vertical cable track 100 and horizontal cable track 102 may be provided to guide electrical cables (not shown) leading from bottom end mechanism 92 and control handle 104 to an electrical power and control source (also not shown).

Bottom end mechanism 92 may be comprised of control handle 104, gripper arm 106, and gripper 108. Gripper arm 106 may provide a means to adjustably and rigidly secure vertical gantry arm 86 to gripper 108 (described in detail below) to which ducts are attached for cutting. Each degree of freedom may be turned off or on with a button conveniently placed on control handle 104 located at the point of manipulation, and as indicated above, each axis brake may be controlled by pneumatics. The buttons on control handle 104 may control gripper 108 actuation, wrist lockup, arm/ gantry lockup, and vertical position lockup.

Figure 6:
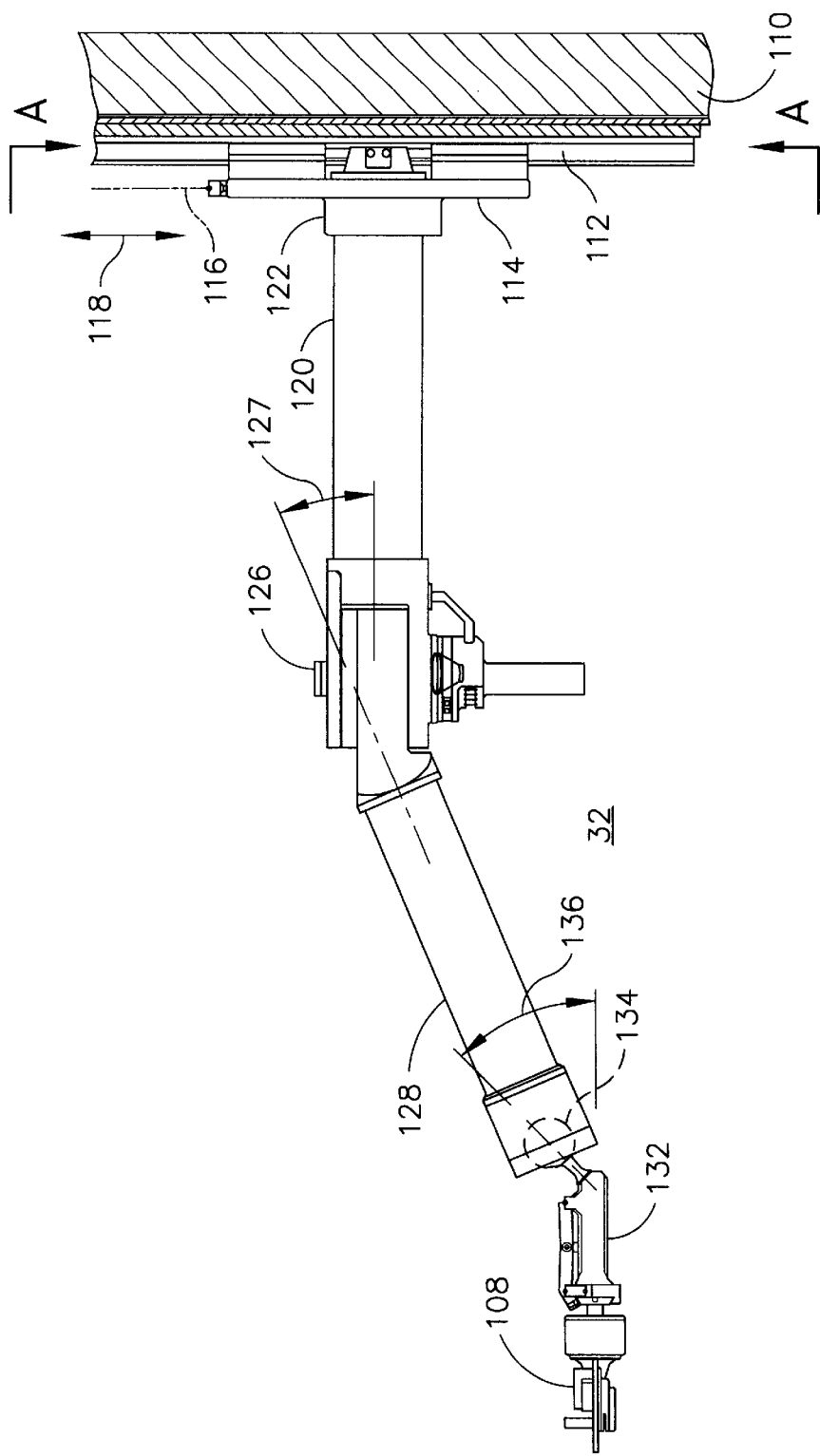
FIG. 6 is an elevational view of the flexible duct holding system vertical articulated arm.
Figure 7:
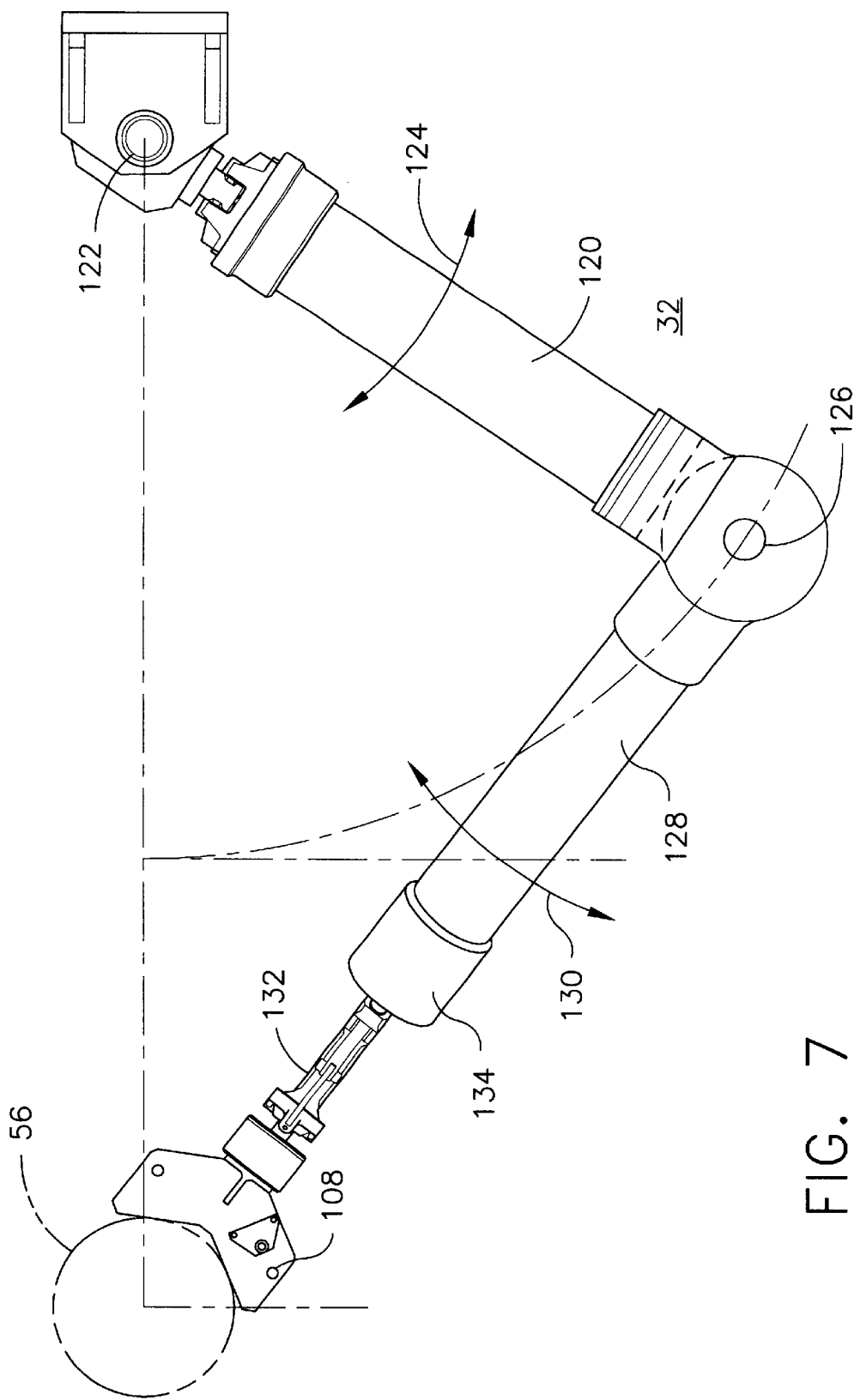
FIG. 7 is a top view of the flexible duct holding system vertical articulated arm along section line A—A of FIG. 6.

Referring again to FIG. 4, vertical articulated arm 32 is shown in perspective view supported by and extending outward from the back side wall 110 of safety enclosure and tooling fixture 40. FIG. 6 provides a detailed elevational view of said vertical articulated arm 32 and FIG. 7 provides a top view along section line A—A of FIG. 6. Referring to the latter two figures, it is seen that vertical articulated arm 32 may be movably supported on back side wall 110 by means of slide 114 riding on rails 112, thus providing for vertical translation in the direction of arrows 118. Vertical translation of vertical articulated arm 32 may be by any means known in the art, such as manually, motorized, or by means of a cable 116 attached to a pulley (not shown). First arm section 120 may be hinged to slide 114 by means of shoulder pin 122 to allow for horizontal translation in the radial direction of arrows 124. Elbow pin 126 may be provided as a second hinge to movably secure the opposing end of first arm section 120 to the adjacent end of second arm section 128. This provides horizontal translation of second arm section 128 in the radial direction of arrows 130. As a means to facilitate proper placement of ducts 56 over the center of turntable 28, second arm 128 may be hinged at an angle 127 from horizontal. Angle 127 may be approximately 30 degrees.

The opposing end of second arm section 128 may be attached, by means of a movable ball and socket joint 134, to wrist section 132 which may be designed to adjustably and rigidly secure vertical articulated arm 32 to gripper 108 (described in detail below) to which ducts 56 are attached for cutting. The centerline of ball and socket joint 134 may be offset an angle 136, equal to approximately 45 degrees, from the corresponding centerline of wrist section 132. The 45 degree angle, may allow more than 180 degrees (hemispherical) motion through the spherical ball and socket joint 134. This may eliminate the need for additional angle adapters that would otherwise add to the bulk and complexity of the vertical articulated arm 32, and eliminates a 90 degree groove in the ball and socket joint 134, which would otherwise be required to achieve hemispherical motion. Thus, the design may greatly simplify the sealing of the pressurized ball and socket joint, which may be required for the pneumatic braking system. The ball may be sealed with a simple gasket around the center of the ball instead of a complex-geometry seal around the groove, which would have extended past the centerline of the ball into the pressurized area.

The 45 degree angled wrist section 132 may also eliminate the need for a rotating socket. If instead a straight wrist section 132 with a groove in the socket had been used to achieve a 90 degree position from vertical, it would have to rotate 360 degrees to achieve hemispherical positioning. Thus this simple design may significantly improve the manufacture of the wrist section 132 ball and socket joint 134.

All movements of the vertical articulated arm 32 may be strictly mechanical, although, as with the vertical gantry arm 86, each axis brake may be controlled by pneumatics to assure that the ducts 56 to be cut may be rigidly fixed in space. In another embodiment, all movements of the vertical articulated arm 32 may be motorized.

Figure 8:
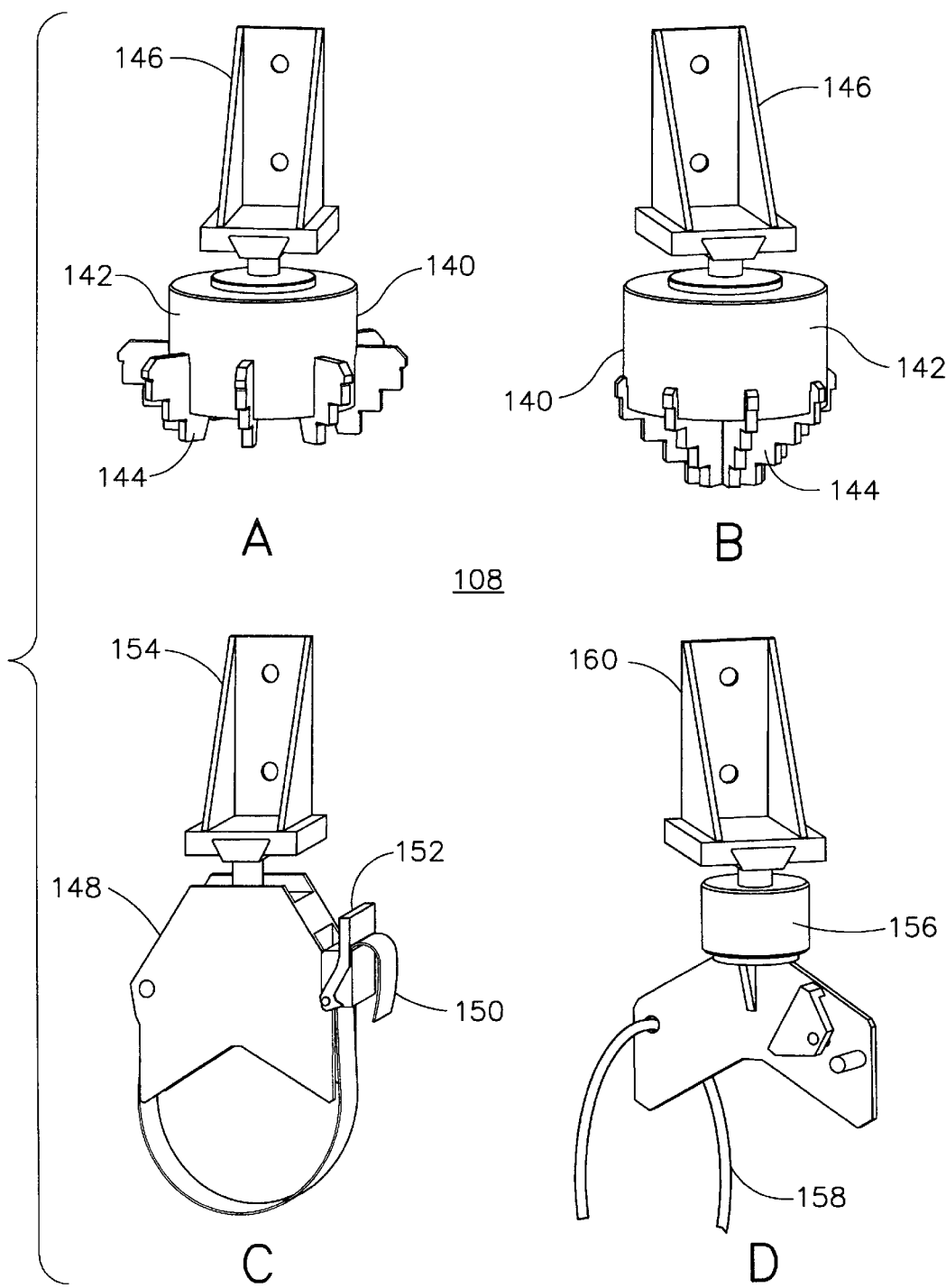
FIG. 8 is a perspective view of four duct gripper embodiments used in conjunction with the flexible duct holding system.

FIG. 8 provides a perspective view of the detailed configuration of four duct 56 gripper 108 embodiments, which may be used in conjunction with the overhead gantry arm 30 and the vertical articulated arm 32. Internally expanding grippers 140 may be designed to hold short ducts 56 from 2 inches to 8 inches in diameter. The internally expanding grippers 140 may be comprised of a cylindrical body 142 around the periphery of which may be placed a plurality of expanders 144 that may extend or retract by the action of a device (not shown), such as a well known worm gear mechanism, located internally within cylindrical body 142. View A illustrates an expander 144, designed to handle larger diameter ducts, in the retracted position, while View B illustrates another expander 144, designed to handle smaller diameter ducts, in the retracted position. In operation, the internally expanding grippers 140 may be positioned internally within a duct 56, and the expanders 144 extended until the expanding gripper 140 may be securely attached to the duct 56. The internally expanding gripper 140 (and attached duct 56) may then be secured, by means of attach bracket 146, to either the gripper arm 106 of the overhead gantry arm 30, or to the wrist section 132 of the vertical articulated arm 32.

FIG. 8, View C illustrates a double-blade V-block gripper 148 which may be used to hold longer ducts 56, approximately 2 inches to 8 inches in diameter that must be supported externally near the center of gravity. A strap and strap lock may be provided to secure the duct 56 to the double-blade V-block gripper 148. The duct 56 and double-blade V-block gripper 148 may then be secured, by means of attach bracket 154, to either the gripper arm 106 of the overhead gantry arm 30, or to the wrist section 132 of the vertical articulated arm 32.

FIG. 8, View D illustrates a single-blade V-block gripper 156 which may be used for ducts 56 having a diameter in the range of approximately 2 inches to 8 inches. It is as small as possible, and intended to be applied as near the duct 56 cutting plane as practical, particularly on strongly curved ducts and tubes that offer little space for gripping along the body. Said single-blade V-block gripper 156 may include a length of bungee cord stretched around the duct 56 to provide holding force, and a bracket 160 for attachment to either the gripper arm 106 of the overhead gantry arm 30, or to the wrist section 132 of the vertical articulated arm 32.

There are very few ducts and tubes that above described gripper 108 configurations and the overhead gantry arm 30 the vertical articulated arm 32 may not support. As can be appreciated, however, the foregoing descriptions relate to preferred gripper 108 embodiments, and modifications may be made to the design of the grippers 108 without departing from the spirit and scope of the invention as set forth above.

Figure 9:
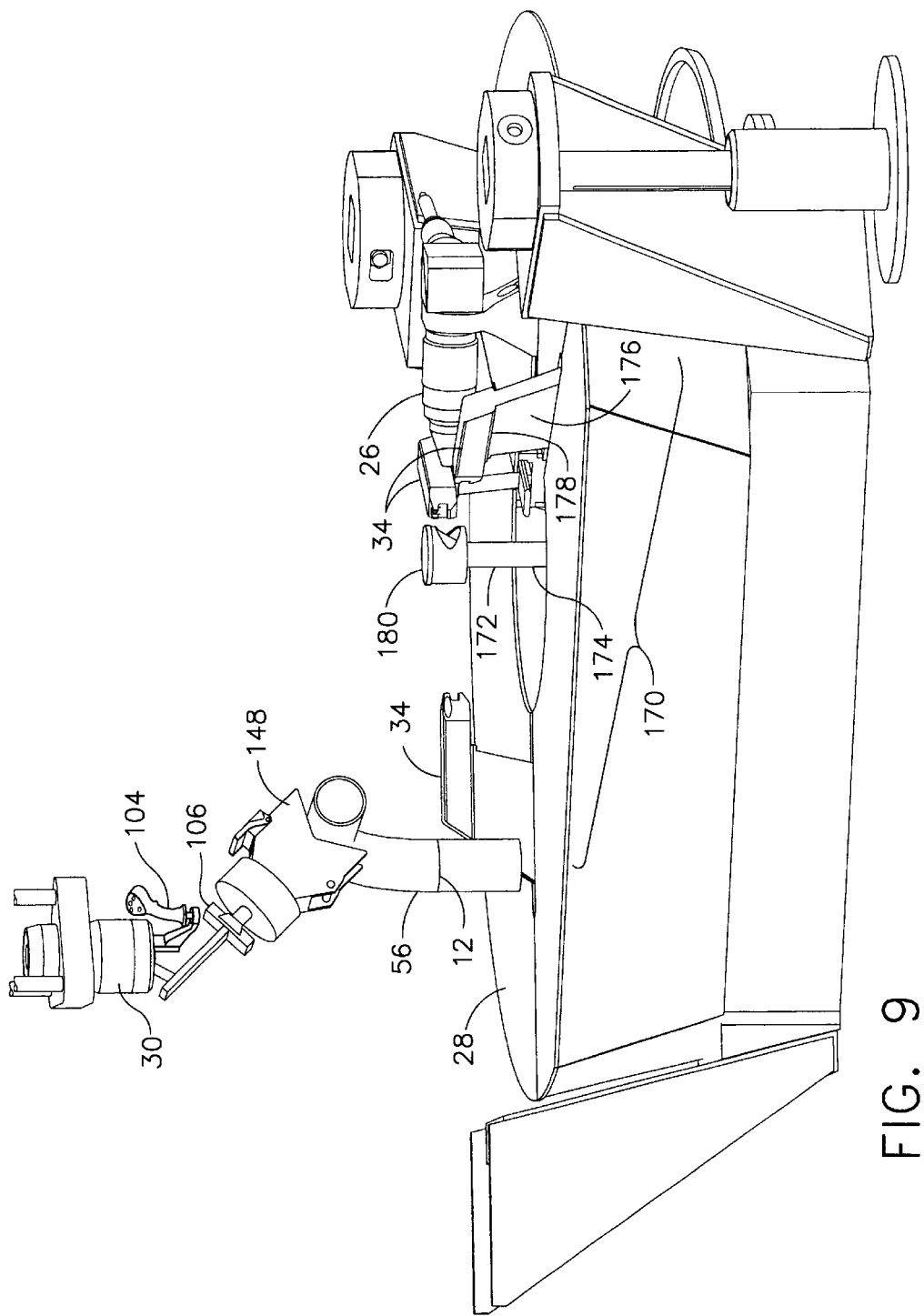
FIG. 9 is a partial perspective view of the turntable showing both the rough positioning alignment unit and duct centering/spatter tube device.

Referring now to FIG. 9, there is shown a partial perspective view of turntable 28 showing both the rough positioning alignment unit 170 and duct centering/spatter tube device 172. The rough position alignment unit 170 comprises three laser line generators 34 that may provide a visual guide to aid the operator to initially mount the duct 56 in the proper position for trimming. The duct centering/spatter tube device 172 may aid the operator in roughly centering the duct 56 and to capture and contain molten metal material. A duct 56 is shown suspended from the overhead gantry arm 30 and gripper arm 106 utilizing a double bade V-block gripper 148 (described above).

The rough positioning alignment unit 170 may be comprised of three laser line generators 34, of a configuration which is well known in the art, located and mounted in camera support assemblies 176, in the image acquisition modules 178 (described in detail below), and thus are in a plane, 120° apart on turntable 28. It may provide three clearly visible laser lines cast onto the circumference of duct 56, in the plane parallel to the surface of the rotating turntable 28 and offset to closely match the height of the laser cutting beam produced by the laser cutting head 26. The tube and duct trim machine 20 operator may simply position the duct 56 using the flexible duct holding system 70 (of which only the overhead gantry arm 30 is shown) and may adjust it until the laser line roughly aligns to the duct 56 scribe line 12 within approximately ±0.125 inch. The duct 56 may then be held in place by the flexible duct holding system 70. On FIG. 9, for illustration purposes only, the duct 56 and the overhead gantry arm 30 are shown to the side of duct centering/spatter tube device 172. However, during cutting operations, the tube or duct is centered immediately over the duct centering/spatter tube device 172, alignment post 174, and anti-spatter tube 180.

Figure 10:
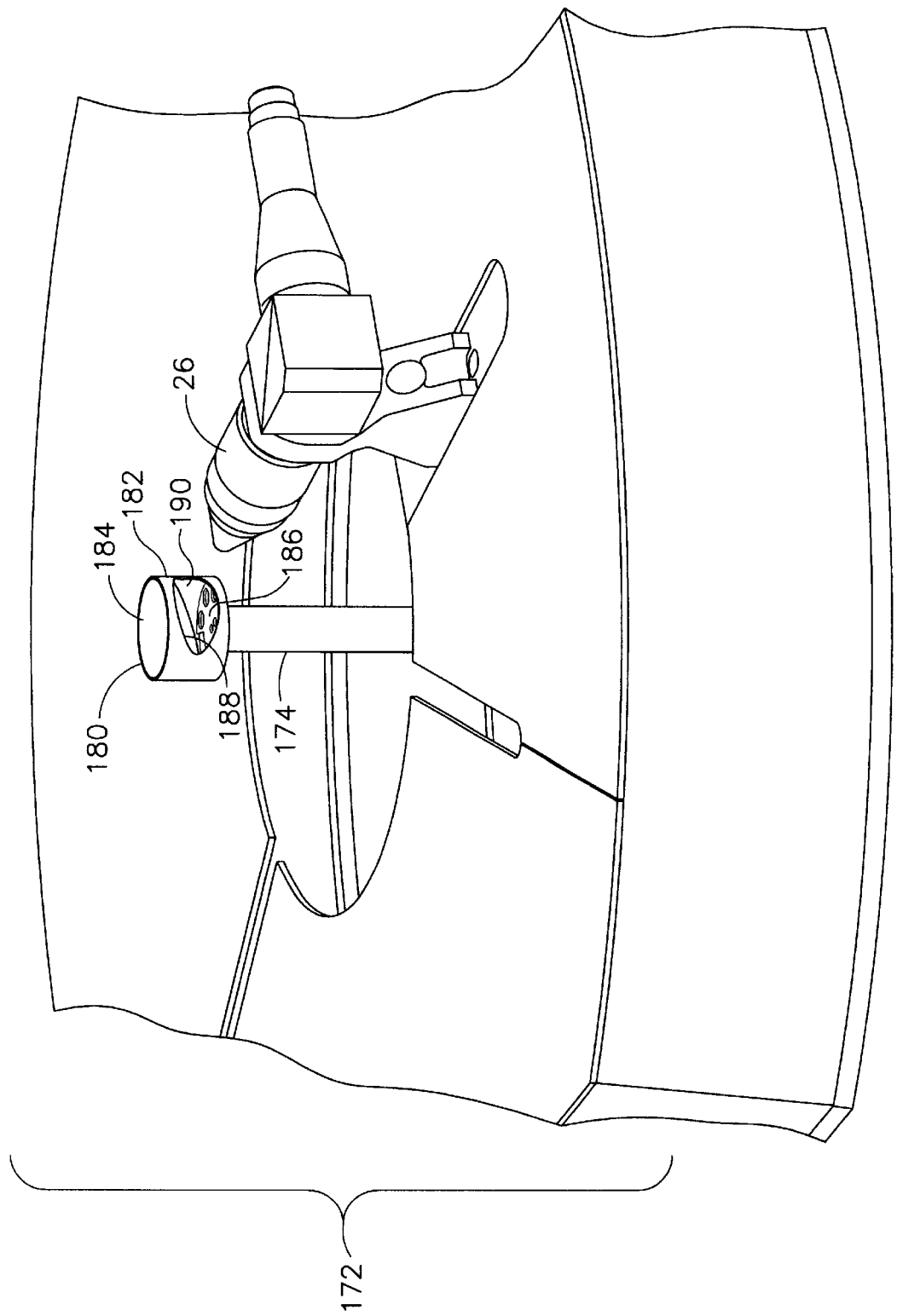
FIG. 10 is a magnified perspective view of the duct centering/spatter tube device and the laser cutting head.

The duct centering/spatter tube device 172 may have two important functions, which are: to roughly center a duct 56 to the center of turntable 28; and to capture and contain the molten material on the inside diameter as the laser cuts the duct 56, thus not contaminating the interior said duct 56. Referring now to FIG. 10, there is shown a close-up perspective view of the duct centering/spatter tube device 172 and laser cutting head 26. The anti-spatter tube 180 may be comprised of a cylindrical tubular element 182, having one open end 184 at the top and one partially closed bottom end 186. The partially closed bottom end 186 has a central aperture 188 to receive the turntable 28 alignment post 174. The anti-spatter tube 180 may be slip fit onto the top of alignment post 174 or held in place by other commonly known means, such as a keyway, magnetic pin, or the like. The anti-spatter tube 180 may thus rotate with the turntable 28, and remain fixed in its relative orientation with the laser cutting head 26 laser beam as it orbits 360° around duct 56.

An opening 190, facing the laser cutting head 26, may be provided on the cylindrical tubular element 182. Said opening 190 may be elliptical, circular, or any other shape, and sized to accommodate the greatest spacing between the circumference of the anti-spatter tube 180 and the inside diameter of the duct 56 being cut (that is, when the next size larger anti-spatter tube 180 will not quite fit within the duct 56 to be cut).

The anti-spatter tubes 180 may be constructed of copper in order that they may efficiently dissipate the extremely high temperature of the defocussed laser beam produced by the laser cutting head 26. The high thermal conductivity of copper may also help prevent the back spatter of molten duct 56 metal from sticking to their surfaces, minimizing buildup of waste metal. There may be a plurality of anti-spatter tubes 180 of differing diameter that may be easily interchanged by the tube and duct trim machine 20 operator to accommodate the various duct 56 geometries. The different anti-spatter tubes 180 may be simply placed onto the alignment post 174, where they are held in place in the manner described above.

Figure 11:
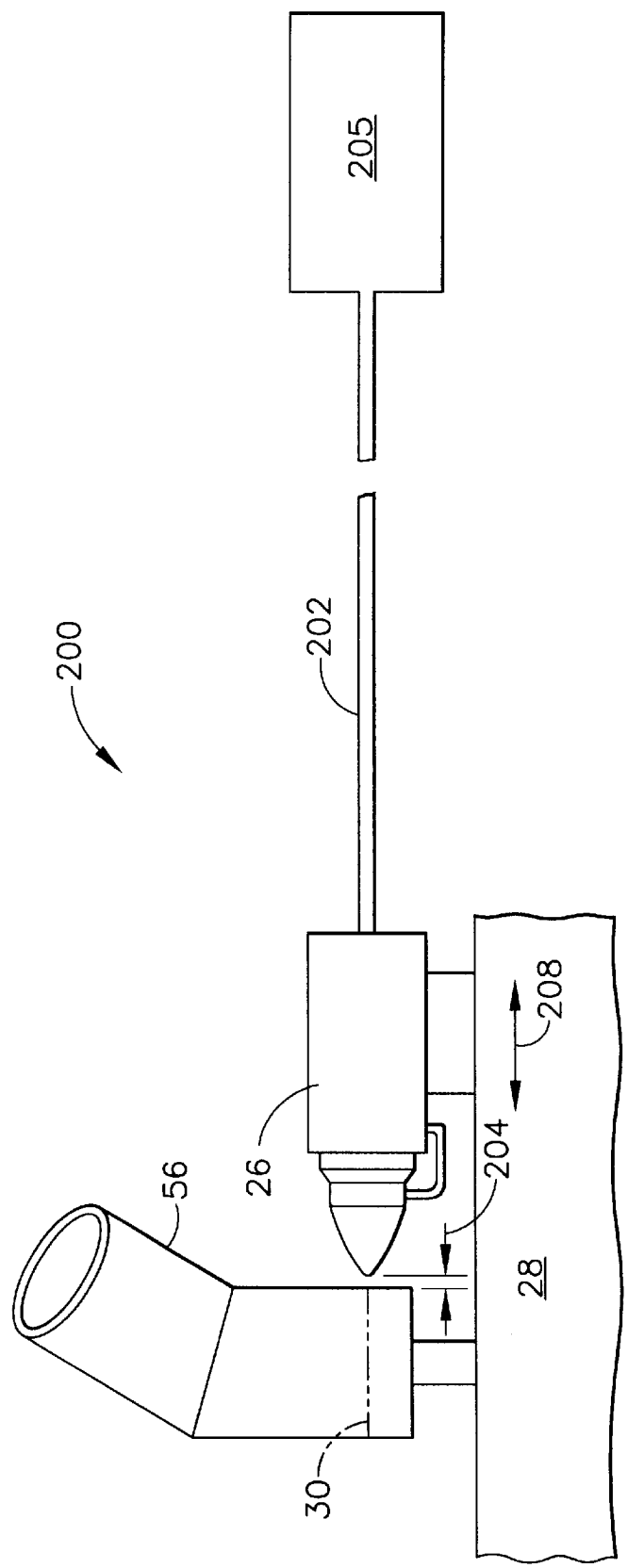
FIG. 11 is a partial cross sectional view of the laser cutting system.

Referring now to FIG. 11, there is shown a partial cross sectional view of the laser cutting system 200. To cut the various gages and materials of ducts 56, a commercially available Nd:YAG (neodymium yttrium aluminum garnet) solid state laser may be used. This laser may deliver a maximum of 2.0 kilowatts of continuous power allowing the cutting of very heavy duct 56 walls (up to a maximum of approximately 0.250 inch, depending on the material) when needed.

A unique feature of this embodiment may be the fiber optic beam cable 202 for delivery of the light energy to the laser cutting head 26 on the turntable 28. An important technical characteristic of Nd:YAG lasers is that the desired frequency of laser beam can be delivered using optical fiber. However, the optical fiber is known to be delicate and expensive. Therefore, to avoid damage, a simple and reliable way, discussed further below, is employed to route the fiber optic beam cable 202 to the tilting/rotating turntable 28.

Use of a fiber optic beam cable 202 avoids having to use conventional hard optics with mirrors. The fiber optic beam cable 202 is shown as it exits the laser power unit 205. The unique fiber optic beam cable 202 energy delivery system may provide significant benefits in that it allows for a much simpler mechanical design of the rotary platform assembly 22 illustrated in FIG. 3. Another benefit of this embodiment may be that the laser power unit 205 may be remotely located (up to approximately 50 meters) from the tube and duct trim machine 20 thus allowing its relocation if needed by the factory. A cable feeder 42 (shown generally on FIG. 2), as embodied, may make use of a nylon strap to hold the cables and optical fiber in careful alignment. This is a novel approach to routing cables to rotating/tilting equipment. The take-up reel may be used to maintain a constant low level of tension on the nylon strap to help keep it in position and prevent the cables from becoming twisted or bent sharply. It is the nylon strap, not the cables that may experience the tension. The cables are protectively held in position, minimizing stress and fatigue. Said cable feeder 42 may wrap and unwrap fiber optic beam cable 202 around a large diameter circle as the turntable 28 rotates to cut the duct 56, thus protecting said fiber optic beam cable's 202 delicate fiber by keeping all motion within allowable bending tolerances. In one embodiment, the laser power unit 205 may be designed to power up to three fiber optic beam cables 202 through a conventional switching device, thus supplying power to up to three tube and duct trim machines.

The cut parameters may be based on the material type, gage, and diameter of the ducts 56. Cut parameter files may be located in a database in the executive software (discussed below). They initiate laser power programs stored in the laser power unit's 204 Programmable Logic Controller (PLC), may control the gas pressure, set the cutting feed rate (turntable velocity), adjust the focus position and control other cutting parameters.

The laser cutting head 26 may incorporate a programmable focus unit that sets the focal point based on the gage of the material to be cut. This is a novel approach for an autofocus unit in that, unlike other known units that have limited positioning capability, it incorporates an independently controllable stepper system. Without this feature the tube and duct trim machine 20 operator would have to manually adjust the focus position for each material gage. Also, due to the many duct 56 diameters being cut, a commercially available device called a "z-axis follower" 206 may be used to maintain a standoff distance 206 of exactly 1.0 mm between the laser cutting head 26 and the duct 56 as it rotates during the cutting process. The standoff distance 206 may be maintained by moving the laser cutting head 26 in and out in the direction of arrow 208. Said standoff distance 206 may be critical to maintain a constant focal depth which may be essential for the creation of high quality cuts. A capacitative sensor with real-time feedback may be employed. The method to control the z-axis follower in the executive software may allow for automatic and real time sampling based on the duct diameter, contour, and material type.

Referring again to FIG. 3, the vision alignment system 24 may be provided to accurately determine the location of the duct 56 scribe line 12 plane with respect to the turntable 28. It may do this by locating the position of the scribe line 12 at three locations around the duct 56, using three cameras spaced 120° apart. As described in detail below, the deviation from the nominal position may be calculated within a vision processor. This deviation may be sent to a main control processor, which uses an algorithm to calculate the offset and drive the vertical actuators 58 to tilt the turntable 28 to the same plane as the scribe line 12 on the duct 56.

Figure 12:
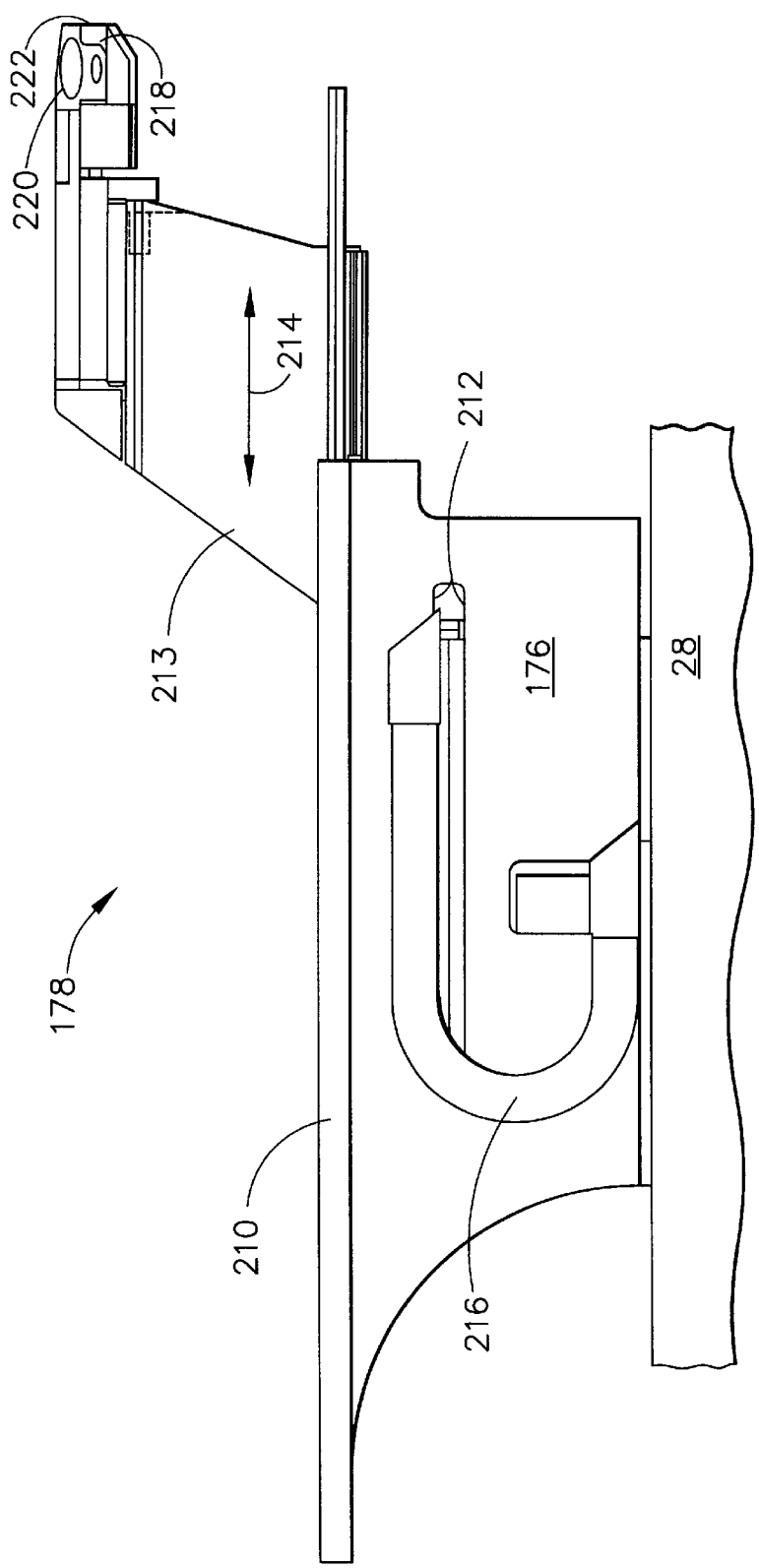
FIG. 12 is an elevational view of an image acquisition module including a camera slide assembly.

The vision alignment system 24 may be comprised of a vision processor module (described below) and three image acquisition modules 178. Referring to FIG. 12, there is shown an elevational view of one of the three image acquisition modules 178 including a non-movable camera support assembly 176. The non-movable camera support assembly 176 may be mounted on turntable 28 and may comprise bearing slide 210, mechanical slide mechanism 212, flexible wire track 216, and movable portion 213. The movable portion 213 may traverse on bearing slide 210 in the direction of arrows 214 by means of the mechanical slide assembly 212 which may include an electric motor (not shown). Flexible wire track 216 contains control wiring leading to the movable portion 213 elements.

Movable portion 213 may comprise movable mechanical assembly 218, color camera 220, and illuminator 222 and laser line generator 34.

Movable mechanical assembly 218 slides in the direction of arrows 214 and when it comes in contact with the exterior surface of duct 56 to be cut, it may be stopped by means of an internally located proximity sensor (not shown) actuated upon contact. Color camera 220 is of a digital matrix configuration coupled with an appropriate lens, and a unique high-intensity LED (Light Emitting Diode) based illuminator 222, all of a configuration well known in the art. The illuminator 222 may produce a sheet of structured light specifically designed to take advantage of the characteristics of the scribe line 12 (FIG. 3) to reflect light directly into the camera 220, causing the scribe line 12 to stand out brightly against the background of the unmarked duct 56 surface.

Each of the image acquisition modules 178 may move (in the direction of arrows 214) from a standby position to the measurement position. In the standby position, color camera 220 lens optics may be covered by a rotating barrel shutter (not shown) to protect them from debris generated during the cutting process. In the measurement position, the mechanical design of the vision processor module 210 may maintain the required focus distance above the duct's 56 surface. As indicated above, movable portion 213 slides in the direction of arrows 214 and stops when it comes in contact with the exterior surface of the duct 56 to be cut. Color camera 220 may be positioned a precise distance (the required focal distance) from the front edge of movable portion 213. When that front edge comes in contact with duct 56, color camera 220 is automatically positioned at a distance, which provides sharp focus on duct 56.

Figure 13:
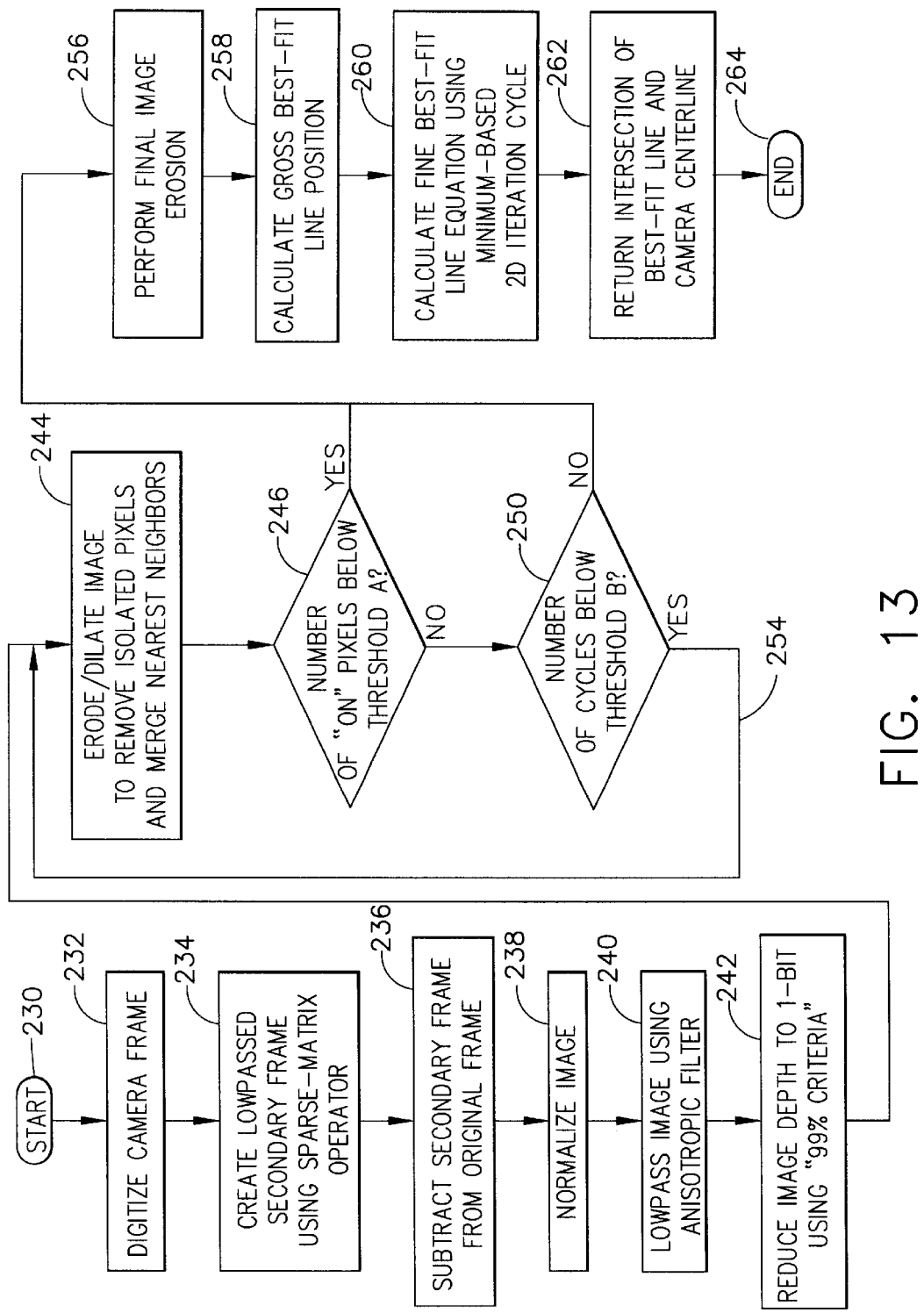
FIG. 13 is a flow diagram illustrating the basic information flow of the vision alignment system software.

Use of a matrix type color camera 220 may be critical to the algorithms used to reliably detect and position the scribe line. Referring now to FIG. 13, there is shown a basic information flow diagram of the vision alignment system 24 software. The sequence may involve the following steps:

(1) The first series of steps, from start 230 to reduce image depth 242 involve preprocessing, which consists of various filtering and normalization functions. The scribe line 12 then appears as a collection of points which are degraded by tube 56 surface imperfections such as handling scratches and voids in the scribe line 12 itself. The steps involve: digitizing the camera frame 232; creating a lowpassed secondary frame 234 using a sparce-matrix operator; subtracting frames 236 (secondary from original); normalizing the image 238; creating another lowpass image 240 using an anisotropic filter; and reducing the image depth 242 to 1-bit, using a "99% criteria".

(2) The collection of points are then filtered using an iterative morphological filter (erosion followed by dilation). Once these operations are complete, a two-stage line-fitting algorithm first roughly locates the potential scribe, then executes a two-dimensional (angle and translation) comparison scan. This scan assigns a probability to each potential line location in angle/translation space. The minimum (best fit) is used to form the equation of a line, which is then intersected with the center-of-frame vertical axis to produce the measured offset of the scribe from the camera axis. The steps involve: erode/dilate the image 244 to remove isolated pixels and merge the nearest neighbors; conducting a pixel threshold check 246 (if the number is below a threshold A, then the process can proceed to final image erosion 256); conducting a cycle threshold 250 check (if the number of cycles is below threshold B, then the process recycles 254 to the erode/dilate the image step 244); performing the final image erosion 256; calculating the gross best fit 258 line position; calculating the fine best fit 260 with a line equation using a minimum-based two dimensional iteration cycle; return intersection 262 of best-fit line and camera centerline; and ending 264 the process.

The line-like nature of the scribe line 12, which would be undetectable using a linear array camera, may be a critical feature used to discriminate between the actual scribe line 12 and the shape signatures of imperfections. This may drive the selection of a two-dimensional matrix camera for the vision alignment system 24.

In summary, the three color cameras 220 may locate a scribe line 12, may calculate its location, which may then supplied to the controller, which in turn may drive the vertical actuators 58 to align the cutting plane with the scribe line 12. The vision alignment system 24 may correct errors in real time if possible or may pass indications back to the main control processor, which may then halt the automatic cutting process and request manual correction by the operator.

An alternative embodiment to the scribe finding algorithm described above may be to simply not use it. Specifically, the color camera 220 may be at a known distance from the duct 56 to be cut. The field of view therefore represents a precisely known height. When the operator sees the video image of the scribe line, all he may have to do is position the cursor at the scribe line and proceed with trimming the duct. The control system design may permit the operator to do this by overriding the scribe finding algorithm if he feels the algorithm is in error.

However, the advantage of the vision system may be that it saves some time in the process by locating the cursor on the scribe line automatically. When using the alternate manual process embodiment, if subsequent attempts to locate to the scribe were necessary, the operator would have to manually position the cursor on the scribe for each attempt. A great value of the vision system and display system may be that it greatly simplifies the operation of the machine. Faint scribes on hard duct material are very hard to see under shop lighting conditions, but are generally findable by the vision system. Since required duct trimming tolerances are generally +/−0.005 inches, without the visual aid of the cameras and their magnified, calibrated images, it may not be possible to hold such tolerances.

A unique feature of the inventive tube and duct trim machine 20 may be the simplified operator interface. This may mean that a high labor grade Computer Numerical Control (CNC) operator may not be required for operation, and it may be used by the same shop mechanics currently doing the manual cutting operation. Hardware interlocks and automatic data collection to determine duct 56 diameter and location may allow a minimal control panel, which may include the following operating functions: Cycle Start; Cycle Selection; Cut relative to a scribe using Vision Alignment System; Cut as placed not using Vision Alignment System (i.e., rough cutting); Perform Tape Test (aid to determining laser alignment); Cut Line Offset; Material Selection; and Status display messages.

Figure 14:
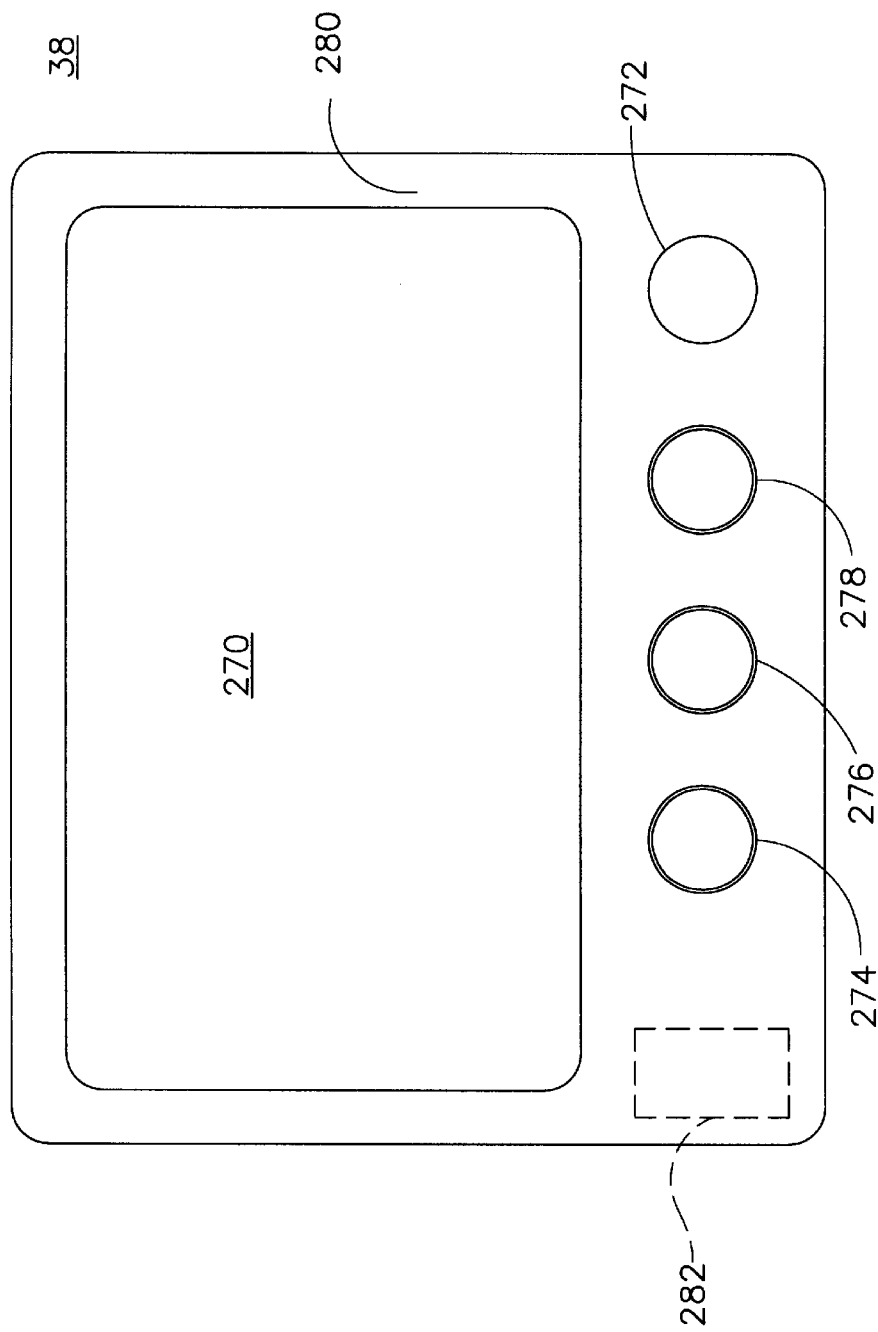
FIG. 14 is an elevational view of the operator's control panel.

The philosophy used to achieve this simplicity may be to reduce the machine operation to the absolute minimum required to cut ducts 56. Any machine setup, calibration, and/or testing may be accomplished by specially trained maintenance personnel using portable terminals which are not present during normal 20 operation. During normal operation, the entire tube and duct trim machine 20 may be controlled using only one button and three knobs, which have different functions depending on the condition of the system. FIG. 14 is an elevational view of the operator's control panel 38. It includes a multipurpose display screen 270 for video or graphics, a cycle (start/cancel) knob 272, left 274, middle 276, and right 278 rotary control knobs, in a heat dissipating case 280. Connectors 282 for power and communication are located at the rear of the case. Also included (not shown) are an industry standard Emergency Stop safety push button and an Emergency Stop reset push button.

There are only three basic conditions, or states, into which control of the tube and duct trim machine 20 may fall: These are: Standby (machine ready to start a cutting process); Material, Gauge, and Operation Type Selection; and Scribe Location Verification. The operator may move through each of these basic conditions by rotating control knobs 274, 276 and 278, then in turn by depressing the cycle knob 272 on the console.

In the standby condition, the screen 270 may display a video image of the interior of the tube and duct trim machine 20 (as a safety measure) and a text reminder list of the basic steps necessary to tool up a duct 56 for cutting. Once a duct 56 is mounted and the door to the tube and duct trim machine 20 closed, the cycle knob 272 may be depressed, which may cause the control panel to display a "Type Select" screen. Using this screen, the operator may choose a material (metal) type (using right control knob 278), a duct 56 wall thickness range, (using center control knob 276) and optionally a fixed offset distance from the scribe line 12, using the left (control knob).

After the selections are made pressing the cycle knob 272 may initiate measurement of the duct 56. This may determine duct diameter and duct location. If the duct 56 is not positioned close enough to the center of turntable 28 to be correctly trimmed, as determined by the main cell control system, the operator interface may display a message so indicating, and then automatically cancels the operation so that the operator can reposition the duct. (If a rough cut duct has been chosen, and the duct is properly mounted, the system proceeds with trimming without going through the scribe line finding process.) When this is complete, the operator may be presented with three "stripes" of image data, which are extracted from the centerline of each color camera 220. Overlaid on these "stripes" may be video cursors that indicate the location of the automatic measurement of scribe line 12 position, as best determined by the vision alignment system 24. If no change is required, the operator may simply press the cycle knob 272 a third time and the part may be cut. If however it can be seen that the automatic measurement may be in error, the operator may use the left 274, middle 276, or right 278 rotary control knobs to place the video cursors on top of the scribe line images, depressing the cycle knob 272 to cut the duct 56 when satisfied that the locations are correct. At this point, the machine may proceed with the sequence of trimming the duct. After the tube and duct trim machine 20 cuts the duct 56, it may return the operator to the original Standby display. During the cutting operation, the operator may be prompted, at key points in the process, whether to continue or cancel the cycle. Depressing the cycle start button for a few seconds may cancel the cycle. If the operator chooses to cancel at any of these points, the machine may automatically return to the starting position. The cycle may be cancelled at any time by depressing the Emergency Stop push button.

The tube and duct trim machine 20 control system may be based on a distributed architecture consisting of a main cell controller (MCC), a platform mounted controller, and the operator control panel 38 computer discussed above. These separate systems may be supervised by the MCC using serial communication and hardware input/output (I/O).

The MCC may control five servo axes. Referring again to FIGS. 3, 5, 12 and 13, three servos may control the elevation and angle of the turntable 28, one servo may controls the rotary position of the turntable 28, and one servo may controls the elevation of the overhead gantry arm 30. The latter servo control (elevation) input may be set by the operator using an up-down jog button located on the control handle 104 of the overhead gantry arm 30.

The platform control system may also consist of five servo axes. Three servos may control the positions of the camera support assemblies 176, one servo may control the position of the slide 206 containing the laser cutting head 26 and focus unit (laser follower), and one servo may control the programmable focus of the laser cutting head 26. The three camera support assemblies 176 may each contain a color digital matrix camera 220, an LED (Light Emitting Diode) illuminator system to illuminate the camera's 220 field of view, and a laser line generator 34 that projects a thin horizontal red line. The laser line generator 34 may be used as an operator's aid to roughly position the duct 56. A capacitance-sensitive distance-sensing system may be incorporated into the laser cutting head 26 and may be used to sense the distance between the laser cutting head 26 and the duct 56 being trimmed. The platform control system may use this sensor information to maintain the desired cutting distance from the part.

The vision alignment system 24 may be a dedicated unit controlled by the platform control system. The MCC may control the laser using hardware I/O. The MCC may control the platform control system using a combination of serial communication and hardware I/O. The MCC may communicate with and may control the operator interface using only serial communication.

The platform control system may position the camera support assemblies 176 to measure the diameter of the duct 56 and find the scribe line 12. Once the scribe lines 12 have been identified, their locations may be sent to the MCC, which based on that information, may adjust the turntable 28 height and angle to align the scribe line 12 with the laser cutting head 26. Once properly aligned, the control system may advance the laser cutting head 26 to the correct cutting distance from the duct 56. Once in position, the duct 56 may be trimmed using predetermined cutting parameters.

A Nd:YAG laser may cause considerable damage to the eyes of a user. Therefore, a safety enclosure and tooling structure 40 may be provided to contain all laser light during the cutting operation. As illustrated in FIG. 2, the safety enclosure and tooling fixture 40 may have enclosure panels attached to a welded box frame, or sub-structure, which may also serve the dual purpose of providing support for the overhead gantry arm 30, and the vertical articulated arm 32. The safety enclosure and tooling fixture 40 may be mechanically, and electrically interlocked to prevent access when the laser is powered during cutting operations, and when the turntable 28 is in motion.

The tube and duct trim machine 20 may be comprised of only four major components so that it may be quickly and easily moved within a factory. These major components are: the safety enclosure and tooling fixture 40; the turntable 28 including vertical actuators 58; cabling for the laser fiber, power, and communications; and control cabinets and consoles. As indicated previously, another significant practical advantage may be that the laser power unit 204 may be remotely located (up to approximately 50 meters) from the tube and duct trim machine 20, and thus they do not have to be moved if the tube and duct trim machine 20 is re-located.

Referring again to the previously discussed figures, following is simplified description of the principal operational steps that may be accomplished with the inventive tube and duct trim machine:

(1) Select and install the appropriate grippers 108 on the overhead gantry arm 30 and/or the vertical articulated arm 32.

(2) Install the proper anti-spatter tube 180 based on duct 56 diameter.

(3) Attach the duct 56 to the gripper 108 and move the duct 56 such that the scribed line 12 is roughly aligned to the laser line generators 34.

(4) Lock the overhead gantry arm 30 and/or the vertical articulated arm 32 into position.

(5) Close the safety enclosure and tooling structure 40 door, and on the operator control panel 38, push the cycle knob 274.

(6) On the operator control panel 38, use the left, middle, and/or right control knob 274, 276, 278, to select the material type, thickness and any desired offset to scribe line 12.

(7) On the operator control panel 38, depresses the cycle knob 274.

(8) At this point the automatic cycle function takes over and the tube and duct trim machine 20 performs the next sequences automatically.

(9) Measure the duct 56 diameter.

(10) Detect and measure the scribe line 12 misalignment.

(11) Present the automatic scribe line 12 measurements to the operator, via the operator interface. This allows the operator the opportunity to override the scribe line 12 measurement position. The operator presses the cycle knob 274 to continue operation.

(12) Drive the vertical actuators 58 to align the turntable 28 to the scribe line 12, or an offset to the scribe line 12.

(13) The laser turns on and the control system rotates the laser 3600 around the duct 56 at the proper feed rate, laser settings, and stand off distance 204, and cuts the duct 56 to length.

(14) Upon completion of the cutting operation, the laser turns off and the cutting head returns to the retracted position, the turntable returns to the starting load position, and the operator interface displays the starting screen. Finally, the door to the cell unlocks, allowing the operator to enter and remove the duct 56 and the excess cut-off piece.

The expected time to load and tube and duct trim machine 20, operate the cut cycle, cut the duct, and unload may be between approximately 3 and 5 minutes depending upon the complexity of the curved configuration and the tooling time required. The inventive tube and duct trim machine 20 may be significantly faster than current manual methods providing increased production rates, an inherently safer operation reducing risk of injury, and a more accurate cutoff method with better edge quality.

It should be understood, of course, that the foregoing relates to preferred embodiments of the invention and that modifications may be made without departing from the spirit and scope of the invention as set forth in the following claims.

We claim:

1. A tube and duct trim machine, comprising:

a safety enclosure and tooling structure;

a traveling overhead gantry supported on the top side of said safety enclosure and tooling structure;

said overhead gantry having a trolley and an overhead gantry arm movably supported by said trolley;

said overhead gantry arm having a movable gripper arm;

a vertical articulated arm movably supported on the back side wall of said safety enclosure and tooling structure;

said vertical articulated arm having a plurality of movable pined arm sections and a wrist section hinged on a ball and socket;

a plurality of grippers for rigid securement of tubes and ducts to said overhead gantry arm movable gripper arm and to said vertical articulated arm wrist section;

a rotatable turntable supported by a plurality of vertical actuators;

said turntable being controllably oriented in a vertical axis by means of said vertical actuators;

a duct centering/spatter tube device attached to the top center surface of said turntable;

a rough positioning alignment unit, comprised of a plurality of laser line generators, said rough positioning alignment unit being attached to the top surface of said turntable;

a laser cutting system, comprised of a controllable laser cutting head, a fiber optic beam cable and a laser power unit, said laser cutting system being attached to the top surface of said turntable;

a vision alignment system, comprised of a plurality of image acquisition modules located to the top surface of said turntable, and a vision processor module;

a tube and duct trim machine operator control panel;

a main cell controller;

a platform mounted controller;

whereby said tube and duct trim machine accurately positions and precisely cuts tubes and ducts at a pre-established planar scribe line.

2. The tube and duct trim machine of claim 1, wherein the safety enclosure and tooling structure safely contains laser light emitted from the said laser cutting head.

3. The tube and duct trim machine of claim 1, wherein the safety enclosure and tooling structure provides structural support for said overhead gantry arm and said vertical articulated arm.

4. The tube and duct trim machine of claim 1, wherein said overhead gantry arm traverses longitudinally, laterally, and vertically.

5. The tube and duct trim machine of claim 1, wherein said overhead gantry arm further comprises a control handle located at the point of manipulation.

6. The tube and duct trim machine of claim 1, wherein said overhead gantry arm further comprises a positive locking mechanism to prevent motion when activated.

7. The tube and duct trim machine of claim 1, wherein said articulated arm traverses vertically and radially.

8. The tube and duct trim machine of claim 1, wherein said articulated arm may be controlled at the point of manipulation.

9. The tube and duct trim machine of claim 1, wherein said articulated arm further comprises a positive locking mechanism to prevent motion when activated.

10. The tube and duct trim machine of claim 1, wherein said wrist section of said vertical articulated arm is angled at approximately 45 degrees.

11. The tube and duct trim machine of claim 1, wherein said grippers are further comprised of a plurality of expanders that extend and retract inside a tube or duct.

12. The tube and duct trim machine of claim 1, wherein said grippers are further comprised of double-blade v-blocks that externally support tubes and ducts.

13. The tube and duct trim machine of claim 1, wherein said grippers are further comprised of single-blade v-blocks that externally support tubes and ducts.

14. The tube and duct trim machine of claim 1, wherein said turntable is rotatable a full 360 degrees.

15. The tube and duct trim machine of claim 1, wherein said turntable is supported by three of said vertical actuators each located 120 degrees apart.

16. The tube and duct trim machine of claim 1, wherein said vertical actuators are spring loaded and servo-controlled.

17. The tube and duct trim machine of claim 1, wherein said vertical actuators are secured to said turntable by means of radially oriented, free floating fasteners in a spherical-type joint.

18. The tube and duct trim machine of claim 1, wherein said duct centering/spatter tube device further comprises an alignment post secured to the top center surface of said turntable.

19. The tube and duct trim machine of claim 1, wherein said duct centering/spatter tube device further comprises a cylindrical tubular element secured to said alignment post for capturing molten metal produced by said laser cutting system.

20. The tube and duct trim machine of claim 1, wherein said laser line generators are secured to the top surface of said turntable and provide three clearly visible lines cast onto the circumference of said tubes or ducts.

21. The tube and duct trim machine of claim 1, wherein said laser cutting head of said laser cutting system is further comprised of a neodymium yttrium aluminum garnet solid state laser.

22. The tube and duct trim machine of claim 1, wherein said laser cutting head of said laser cutting system is further comprised of a programmable focus unit that sets the focal point based on the gage of the material to be cut.

23. The tube and duct trim machine of claim 1, wherein said fiber optic beam cable of said laser cutting system enables remote location of the laser power unit.

24. The tube and duct trim machine of claim 1, wherein said laser power unit of said laser cutting system provides laser energy to a plurality of tube and duct trim machines.

25. The tube and duct trim machine of claim 1, wherein said image acquisition modules are comprised of:
   a motorized camera slide assembly;
   a range sensor;
   a color digital display camera having an openable rotating barrel shutter; and
   a high intensity light emitting diode based illuminator.

26. The tube and duct trim machine of claim 1, wherein said vision processor module comprises a data processing system enabling performance of the following steps:
   digitizing the camera frame;
   creating a lowpassed secondary frame using a sparce-matrix operator; subtracting frames;
   normalizing the image;
   creating another lowpass image using an anisotropic filter;
   reducing the image depth;
   eroding/dilating the image to remove isolated pixels and merge the nearest neighbors;
   conducting a pixel threshold check;
   conducting a cycle threshold check;
   performing a final image erosion;
   calculating the gross best fit line position;
   calculating the fine best fit with a line equation using a minimum-based two dimensional iteration cycle; and
   returning the intersection of best-fit line and camera centerline.

27. The tube and duct trim machine of claim 1, wherein said machine operator control panel, comprising a multipurpose display screen and a plurality of knobs, controls normal operation of the entire tube and duct trim machine.

28. The tube and duct trim machine of claim 1, where said main cell controller comprises a data processing system enabling performance of the following steps:
   control the elevation and angle of said turntable;
   control the rotary position of said turntable; and
   control the elevation of said overhead gantry arm.

29. The tube and duct trim machine of claim 1, where said platform mounted controller comprises a data processing system enabling performance of the following steps:
   control the positions of said camera slide assemblies;
   control the position of said laser cutting head; and
   control the programmable focus of said laser cutting head.

30. A tube and duct trim machine, comprising:
   a safety enclosure and tooling structure;
   a traveling overhead gantry;
   said overhead gantry having a movably supported overhead gantry arm;
   a vertical articulated arm supported on the back side wall of said safety enclosure and tooling structure;
   a plurality of grippers for rigid securement of tubes and ducts to said overhead gantry arm and to said vertical articulated arm;
   a rotatable turntable supported and controllably oriented by a plurality of vertical actuators;
   a duct centering/spatter tube device;
   a rough positioning alignment unit, comprised of a plurality of laser line generators;
   a laser cutting system, comprised of a controllable laser cutting head, a fiber optic beam cable and a laser power unit;
   a vision alignment system, comprised of a plurality of image acquisition modules, and a vision processor module;
   a tube and duct trim machine operator control panel;
   a main cell controller;
   a platform mounted controller;
   whereby said tube and duct trim machine accurately positions and precisely cuts tubes and ducts at a pre-established planar scribe line.

31. The tube and duct trim machine of claim 30, wherein the safety enclosure and tooling structure safely contains laser light emitted from the said laser cutting head and provides structural support for said overhead gantry arm and said vertical articulated arm.

32. The tube and duct trim machine of claim 30, wherein said overhead gantry arm traverses in a plurality of directions, and further comprises a positive locking mechanism to prevent motion when activated.

33. The tube and duct trim machine of claim 30, wherein said articulated arm traverses vertically and radially and further comprises a positive locking mechanism to prevent motion when activated.

34. The tube and duct trim machine of claim 30, wherein said wrist section of said vertical articulated arm is angled at approximately 45 degrees.

35. The tube and duct trim machine of claim 30, wherein said grippers are further comprised of tube and duct internal expanders, and tube and duct external v-block supports.

36. The tube and duct trim machine of claim 30, wherein said turntable is rotatable, and is supported by three of said vertical actuators each being spring loaded and servo-controlled.

37. The tube and duct trim machine of claim 30, wherein said duct centering/spatter tube device further comprises an alignment post, and a cylindrical tubular element secured to said alignment post for capturing molten metal produced by said laser cutting system.

38. The tube and duct trim machine of claim 30, wherein said laser line generators provide three clearly visible lines cast onto the circumference of said tubes or ducts.

39. The tube and duct trim machine of claim 30, wherein said laser cutting head of said laser cutting system is further comprised of a solid state laser having a programmable focus unit that sets the focal point based on the gage of the material to be cut.

40. The tube and duct trim machine of claim 30, wherein said fiber optic beam cable of said laser cutting system enables remote location of the laser power unit and provides laser energy to a plurality of tube and duct trim machines.

41. The tube and duct trim machine of claim 30, wherein said image acquisition modules are comprised of a range sensing color digital display camera and a high intensity light emitting diode based illuminator.

42. The tube and duct trim machine of claim 30, wherein said vision processor module comprises a data processing system enabling performance of the following steps:

digitizing the camera frame;

creating a plurality of lowpassed images;

reducing the image depth;

eroding/dilating the image;

conducting a pixel threshold check;

conducting a cycle threshold check;

calculating the gross and fine best fit with a line equations; and returning the intersection of best-fit line and camera centerline.

43. The tube and duct trim machine of claim 30, wherein said machine operator control panel, comprising a multipurpose display screen and a plurality of knobs, controls normal operation of the entire tube and duct trim machine.

44. The tube and duct trim machine of claim 30, where said main cell controller comprises a data processing system enabling control of said turntable positions, and control of said overhead gantry arm.

45. The tube and duct trim machine of claim 30, where said platform mounted controller comprises a data processing system enabling control of said camera slide assemblies, laser cutting head; and laser cutting head.

46. A machine, comprising:

a safety enclosure and tooling structure;

a movably supported overhead gantry arm;

a vertical articulated arm;

a plurality of grippers;

a rotatable and vertically adjustable turntable;

a centering/spatter tube device;

a rough positioning alignment unit;

a laser cutting system;

a vision alignment system;

a machine operator control panel;

a main cell controller;

a platform mounted controller;

whereby said machine accurately positions and precisely cuts tubes, ducts, other such elements at a pre-established planar scribe line.

47. The machine of claim 46, wherein said overhead gantry arm traverses in a plurality of directions.

48. The machine of claim 46, wherein said articulated arm traverses in a plurality of directions.

49. The machine of claim 46, wherein said grippers support tubes, ducts and other such elements.

50. The machine of claim 46, wherein said rough positioning alignment unit roughly positions on said turntable said tubes, ducts and other such elements.

51. The machine of claim 46, wherein said laser cutting system is further comprised of a laser cutting head, a solid state laser, a fiber optic beam cable, and a laser power unit.

52. The machine of claim 46, wherein said vision alignment system is comprised of a camera, a high intensity light, and a vision processor module.

53. The machine of claim 46, wherein said machine operator control panel controls operation of the machine.

54. The machine of claim 46, where said main cell controller comprises a data processing system enabling control of said turntable positions and said overhead gantry arm.

55. The machine of claim 46, where said platform mounted controller comprises a data processing system enabling control of said vision alignment system and said laser cutting system.

* * * * *